US012434486B2

(12) United States Patent
Yamamuro et al.

(10) Patent No.: US 12,434,486 B2
(45) Date of Patent: Oct. 7, 2025

(54) PRINTING APPARATUS AND METHOD OF CONTROLLING PRINTING APPARATUS

(71) Applicant: CANON KABUSHIKI KAISHA, Tokyo (JP)

(72) Inventors: Tomoki Yamamuro, Kanagawa (JP); Kazuhiko Sato, Tokyo (JP); Kazuo Suzuki, Kanagawa (JP); Takeshi Murase, Kanagawa (JP); Hiroshi Taira, Tokyo (JP); Hiroshi Kawafuji, Tokyo (JP); Sae Mogi, Kanagawa (JP); Masaki Nitta, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 234 days.

(21) Appl. No.: 18/067,946

(22) Filed: Dec. 19, 2022

(65) Prior Publication Data

US 2023/0202193 A1 Jun. 29, 2023

(30) Foreign Application Priority Data

Dec. 27, 2021 (JP) ................................. 2021-212544

(51) Int. Cl.
*B41J 2/21* (2006.01)
*B41J 2/045* (2006.01)

(52) U.S. Cl.
CPC ......... *B41J 2/2107* (2013.01); *B41J 2/04563* (2013.01); *B41J 2/2132* (2013.01)

(58) Field of Classification Search
CPC .... B41J 2/2107; B41J 2/04563; B41J 2/2132; B41J 2/195; B41J 2/04535; B41J 2/0454; B41J 2/04571; B41J 2/175
See application file for complete search history.

(56) References Cited

U.S. PATENT DOCUMENTS 6,406,113 B1 * 6/2002 Kato ...................... B41J 2/0458 347/14
7,347,519 B2 3/2008 Nagamura
7,367,643 B2 5/2008 Furuichi
7,396,098 B2 7/2008 Kanematsu
7,517,044 B2 4/2009 Suzuki
7,775,622 B2 8/2010 Suzuki
7,798,593 B2 9/2010 Nitta
(Continued)

FOREIGN PATENT DOCUMENTS

JP H09-011491 A 1/1997

*Primary Examiner* — Kristal Feggins
(74) *Attorney, Agent, or Firm* — Venable LLP

(57) ABSTRACT

An object is to provide a technique of calculating an ejection amount of an ink in accordance with a printing head. A printing apparatus includes: a printing head including an ejection port array in which multiple ejection ports to eject an ink are arrayed; a conveyer unit configured to convey a printing medium in a conveyance direction; and a controller unit configured to control the printing head. The controller unit executes processing to obtain the printing dot number based on printing data and processing to calculate an amount of the ink used in a case of performing printing based on the printing data by using different calculation methods between a case where a first printing mode is set and a case where a second printing mode is set based on the printing dot number and an ejection amount conversion factor corresponding to a temperature of the printing head.

25 Claims, 19 Drawing Sheets

(56) References Cited

U.S. PATENT DOCUMENTS

| | | | |
|---|---|---|---|
| 8,231,216 B2 | 7/2012 | Yamamuro | |
| 8,240,802 B2 | 8/2012 | Nakano | |
| 8,366,230 B2 | 2/2013 | Taira | |
| 8,371,673 B2 | 2/2013 | Maru | |
| 8,444,246 B2 | 5/2013 | Muro | |
| 8,469,484 B2 | 6/2013 | Jogo | |
| 8,613,492 B2 | 12/2013 | Suzuki | |
| 8,628,163 B2 | 1/2014 | Kanematsu | |
| 8,651,614 B2 | 2/2014 | Sakamoto | |
| 8,651,616 B2 | 2/2014 | Maru | |
| 8,675,250 B2 | 3/2014 | Muro | |
| 8,702,192 B2 | 4/2014 | Danzuka | |
| 8,740,333 B2 | 6/2014 | Teshigawara | |
| 8,757,754 B2 | 6/2014 | Azuma | |
| 8,783,832 B2 | 7/2014 | Oonuki | |
| 8,864,266 B2 | 10/2014 | Suzuki | |
| 8,888,223 B2 | 11/2014 | Oonuki | |
| 8,931,869 B2 | 1/2015 | Kawafuji | |
| 8,931,875 B2 | 1/2015 | Kosaka | |
| 8,950,843 B2 | 2/2015 | Oikawa | |
| 8,979,238 B2 | 3/2015 | Nishikori | |
| 9,016,821 B2 | 4/2015 | Masuda | |
| 9,028,029 B2 | 5/2015 | Azuma | |
| 9,033,471 B2 | 5/2015 | Oonuki | |
| 9,039,112 B2 | 5/2015 | Murayama | |
| 9,079,421 B2 | 7/2015 | Kato | |
| 9,108,403 B2 | 8/2015 | Kawatoko | |
| 9,108,409 B2 | 8/2015 | Suzuki | |
| 9,114,607 B2 | 8/2015 | Ishii | |
| 9,126,403 B2 | 9/2015 | Ojiro | |
| 9,138,991 B2 | 9/2015 | Murase | |
| 9,545,791 B2 | 1/2017 | Oonuki | |
| 9,656,459 B2 | 5/2017 | Kuwabara | |
| 10,223,624 B2 | 3/2019 | Yamamuro | |
| 10,668,717 B2 | 6/2020 | Azuma | |
| 10,755,151 B2 | 8/2020 | Ishii | |
| 11,020,959 B2 | 6/2021 | Murase | |
| 11,077,687 B2 | 8/2021 | Nishioka | |
| 11,155,078 B2 | 10/2021 | Umezawa | |
| 11,292,268 B2 | 4/2022 | Kawafuji | |
| 11,383,536 B2 | 7/2022 | Genta | |
| 2015/0054881 A1* | 2/2015 | Tanaka | B41J 29/38 347/19 |
| 2021/0252851 A1 | 8/2021 | Murase | |
| 2021/0300031 A1 | 9/2021 | Kawafuji | |
| 2021/0402813 A1 | 12/2021 | Murase | |
| 2022/0016882 A1 | 1/2022 | Umezawa | |
| 2022/0080747 A1 | 3/2022 | Kato | |
| 2022/0080754 A1 | 3/2022 | Kawafuji | |

* cited by examiner

| TEMPERATURE OF PRINTING HEAD | LOWER THAN 40°C | 40°C OR HIGHER AND LOWER THAN 50°C | 50°C OR HIGHER AND LOWER THAN 60°C | 60°C OR HIGHER |
|---|---|---|---|---|
| EJECTION AMOUNT CONVERSION FACTOR (V) | V1 | V2 | V3 | V4 |

FIG.10

PRINTING APPARATUS AND METHOD OF CONTROLLING PRINTING APPARATUS

BACKGROUND

Field of the Invention

The present disclosure relates to a printing apparatus and a method of controlling a printing apparatus.

Description of the Related Art

Japanese Patent Laid-Open No. H9-11491 (PTL 1) describes calculation of a use amount of a liquid (for example, an ink or the like) by counting the number of dots printed by each nozzle of multiple nozzles (ejection ports) and multiplying each dot number by an ejection amount of the corresponding nozzle taking into consideration a temperature of a printing head. Additionally, PTL 1 describes that the ink use amount is calculated by taking an average of the printed dot numbers between adjacent nozzles and assuming that the average value is the printed dot number of each nozzle.

However, with the method of calculating the use amount of the liquid of each ejection port, the calculation accuracy is improved but the calculation speed slows down. On the other hand, with the method of averaging the dot numbers ejected from the ejection ports of the printing head, the processing speed in the calculation of the use amount of the liquid is increased but the processing accuracy is reduced. In view of this, there has been demanded to satisfy both the speed and accuracy in the calculation of the use amount of the liquid.

An object of the present disclosure to solve the above problem is to provide a technique of calculating an ejection amount of a liquid in accordance with a temperature of a printing head.

SUMMARY

In order to achieve the above-described object, a printing apparatus according to the present disclosure includes: a printing head including an ejection port array in which a plurality of ejection ports to eject an ink are arrayed; a conveyer unit configured to convey a printing medium in a conveyance direction; and a controller unit configured to count a printing dot number based on printing data, perform a first calculation for calculating an amount of the ink used in a case of performing printing based on the printing data in a case where a first printing mode is set based on the printing dot number and an ejection amount conversion factor corresponding to a temperature of the printing head, and perform a second calculation different form the first calculation for calculating an amount of the ink used in a case of performing printing based on the printing data in case where a second printing mode is set.

Further features of the present invention will become apparent from the following description of exemplary embodiments with reference to the attached drawings.

BRIEF DESCRIPTION OF THE DRAWINGS

FIG. 10 is a diagram illustrating an example of a table;

DESCRIPTION OF THE EMBODIMENTS

First Embodiment

«Printing Apparatus 100»

Figure 1:
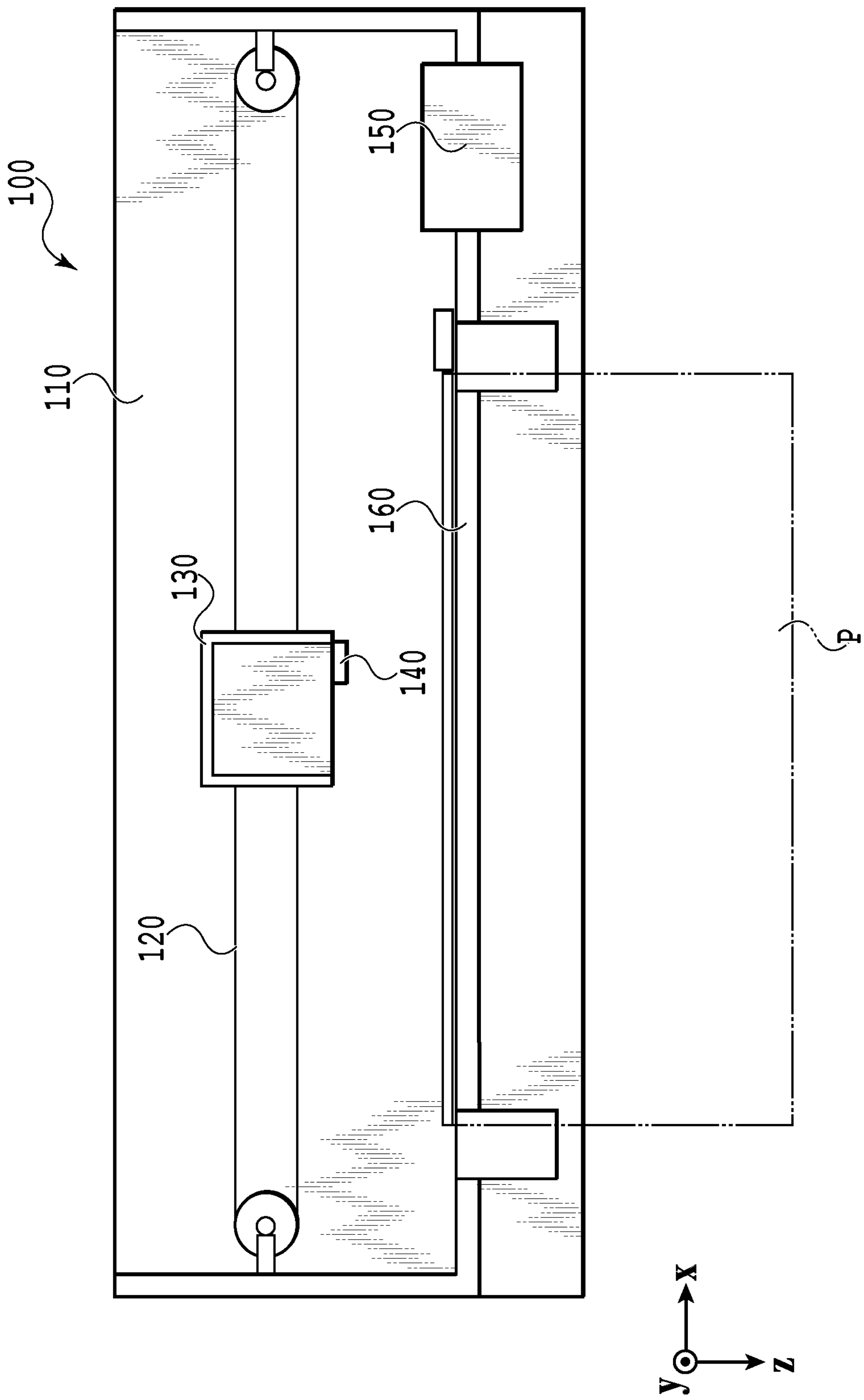
FIG. 1 is a diagram describing a configuration of a printing apparatus.

FIG. 1 is a side cross-sectional view describing a configuration of a printing unit of an ink jet printing apparatus (hereinafter, simply referred to as a "printing apparatus") according to the present disclosure. A printing apparatus 100 includes a main body 110, a belt 120, a carriage 130, a printing head 140, a recovery mechanism 150, and a platen 160. The main body 110 includes a not illustrated paper conveyer unit (for example, a conveyer roller).

The carriage 130 as a movement unit that moves the printing head 140 in a scanning direction crossing an ejection port array 220 (see FIGS. 2A and 2B) is attached so as to be slidable in a main scanning direction (an x direction in FIG. 1) along the belt 120. In the carriage 130, the printing head 140 is detachably mounted. The carriage 130 reciprocally moves with driving force transmitted from a carriage motor 313 (described later) through the belt 120, and a liquid (for example, an ink) is ejected from the printing head 140 during the reciprocal movement. Additionally, the printing apparatus 100 includes the recovery mechanism 150 that improves an ejection state of the ink from ejection ports 235 (described later) in the printing head 140 (that is, performs a recovery operation). The recovery mechanism 150 includes a cap unit that caps an ejection surface of the printing head 140 and a suction mechanism that removes a thickened ink and the like in the ejection ports 235 by generating a negative pressure by a suction operation of a pump while the ejection surface is capped with the cap unit.

In the printing apparatus configured as described above, a printing medium P is conveyed in a conveyance direction.

Specifically, the printing medium P is conveyed in a sub scanning direction (a y direction in FIGS. 2A and 2B) crossing the main scanning direction. The printing head 140 ejects the ink onto a printing region of the printing medium P based on a printing signal transmitted from a main controller unit 300 (described later) as a controller unit while moving in the main scanning direction together with the carriage 130. Note that, in the present embodiment, the printing head 140 ejects an ink of a single color (for example, black (Bk)) in a z direction. With such an ink ejection operation and a conveyance operation being repeated, printing is performed on the printing region of the printing medium P.

The platen 160 holding the printing medium P is provided with a suction configuration that sucks the printing medium P to draw the printing medium P to the platen 160 side in order to reduce the floating of the printing medium P due to curl and cockling.

«Configuration of Printing Head 140»

Figure 2A:
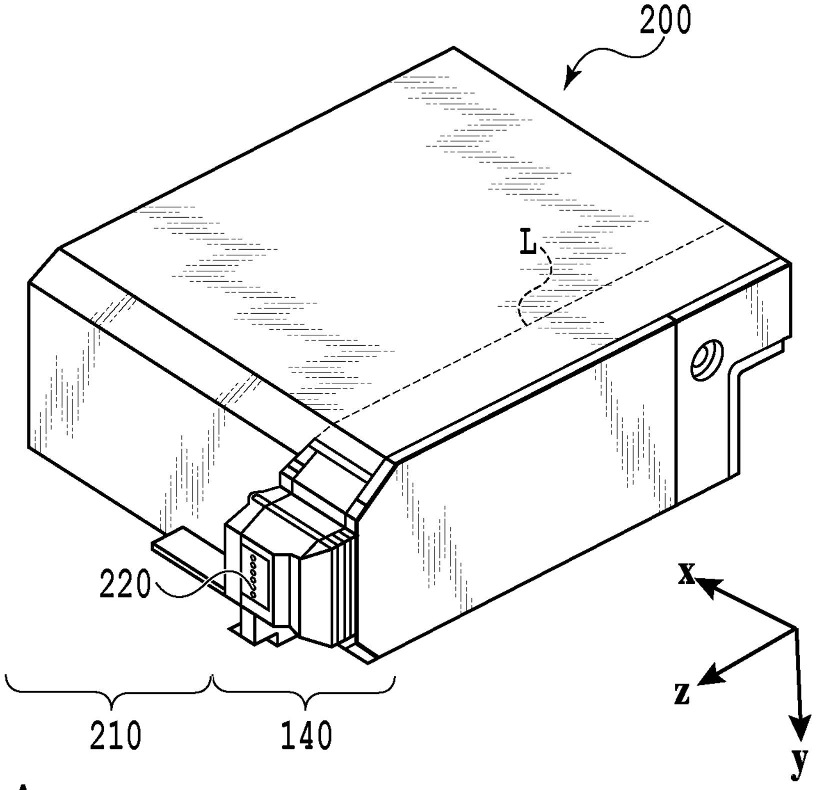
FIGS. 2A and 2B are schematic diagrams of a cartridge and an element substrate.
Figure 2B:
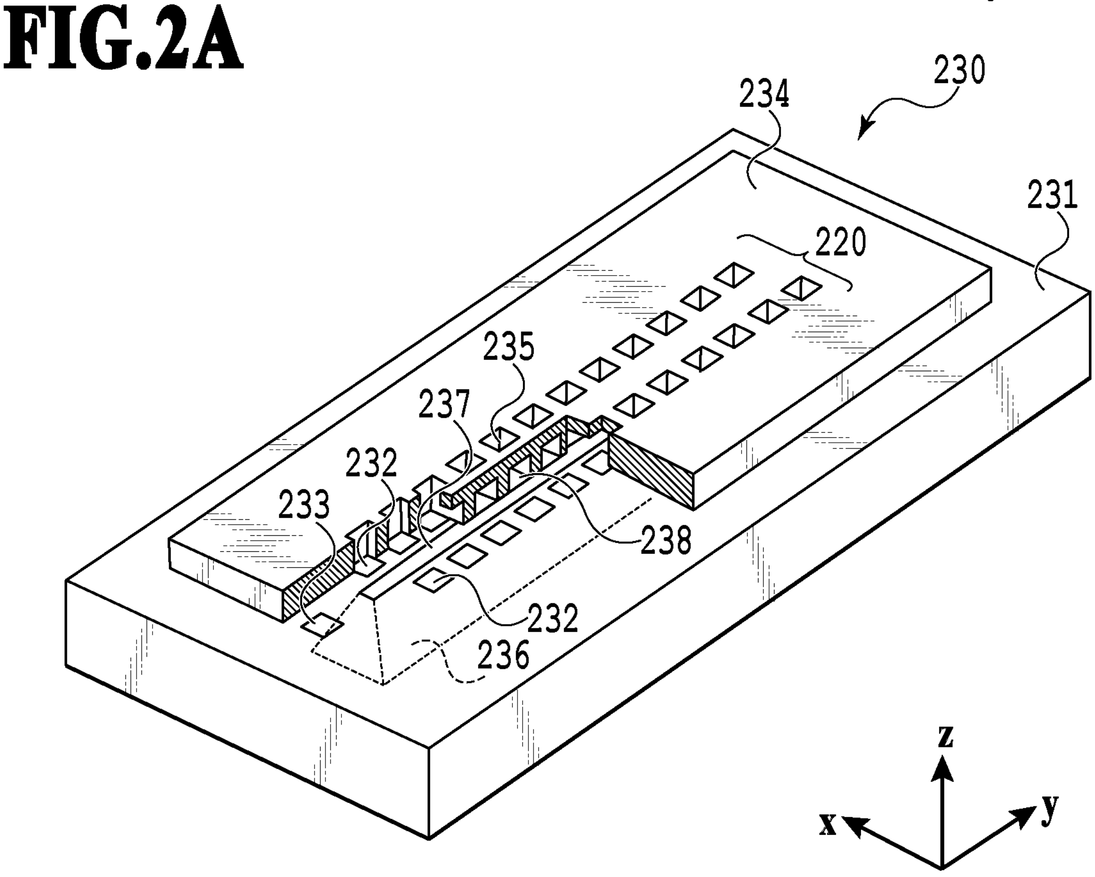

FIGS. 2A and 2B are schematic diagrams of a cartridge 200 and an element substrate 230 in the present embodiment. FIG. 2A is an exterior perspective view of the cartridge 200 used in the present embodiment. As illustrated in FIG. 2A, the cartridge 200 includes an ink tank 210 and the above-described printing head 140. In the printing head 140 that prints an image on the printing medium P, the ejection port array 220 is formed. Inside the ink tank 210, a fibrous or porous ink absorber is stored to hold the ink to be supplied to the printing head 140.

The cartridge 200 can separate the ink tank 210 from the printing head 140 at the position of a boundary line L. With this, in a case where the ink in the ink tank 210 is consumed, the ink tank 210 can be replaced while the printing head 140 kept mounted in the carriage 130. Note that, the printing head 140 and the ink tank 210 may be integrally formed. With the cartridge 200 being mounted in the carriage 130, an electrode (not illustrated) arranged on a side surface of the cartridge 200 is electrically connected with a main body substrate (not illustrated) of the printing apparatus 100. Then, in accordance with an ejection signal that the electrode receives from the main body substrate, the ink is ejected from the ejection port array 220 of the printing head 140.

FIG. 2B is a diagram describing a configuration of the element substrate 230, which is a part that ejects the ink in the printing head 140. The element substrate 230 includes a substrate 231, heaters 232, a temperature sensor 233, a flow channel member 234, the ejection ports 235, an ink supply port 236, a common liquid chamber 237, and liquid flow channels 238.

The element substrate 230 is mainly formed of the flow channel member 234 laminated on the substrate 231. In the substrate 231, the heaters 232 as an energy generation element to eject the ink are arrayed at a predetermined pitch in the y direction in FIG. 2B. In the present embodiment, there are two rows of the heaters 232 arrayed at a predetermined pitch. The ink supply port 236 extending in the y direction and penetrating in the z direction is provided between the two rows of the heaters 232. The ink supplied from the ink tank 210 is supplied to the element substrate 230 through the ink supply port 236.

The temperature sensor 233 that detects a temperature of the printing head 140 is arranged at an end portion on the substrate 231. Note that, as the detected temperature by the temperature sensor 233, substantially, a temperature of the ink in contact with the temperature sensor 233 is detected. In the flow channel member 234, the ejection ports 235 are provided at positions facing the individual heaters 232 and form the ejection port array 220 arrayed in the y direction. The two rows of the ejection port arrays 220 are arranged to be displaced from each other at a half pitch in the y direction. In the present embodiment, the ejection port arrays 220 allows for printing of a dot at a desired printing resolution (for example, 1200 dpi). Specifically, in the ejection port arrays 220, 1280 ejection ports 235 are arrayed at a density of about 490 pieces per centimeter in the sub scanning direction (y direction).

Additionally, the flow channel member 234 is provided with the liquid flow channels 238 communicating with the corresponding ejection ports 235 and the common liquid chamber 237 connected with the ink supply port 236 and connected commonly with the multiple liquid flow channels 238.

Under the above configuration, the ink supplied from the ink supply port 236 to the common liquid chamber 237 is introduced to each ejection port 235 through the individual liquid flow channel 238 and forms a meniscus. Then, once a predetermined pulse voltage is applied to the corresponding heater 232 in accordance with the ejection signal, film boiling is generated in the ink in contact with the heater 232, and an ink droplet is ejected in the z direction from the ejection port 235 with a growing energy of the generated bubble.

«Block Diagram»

Figure 3:
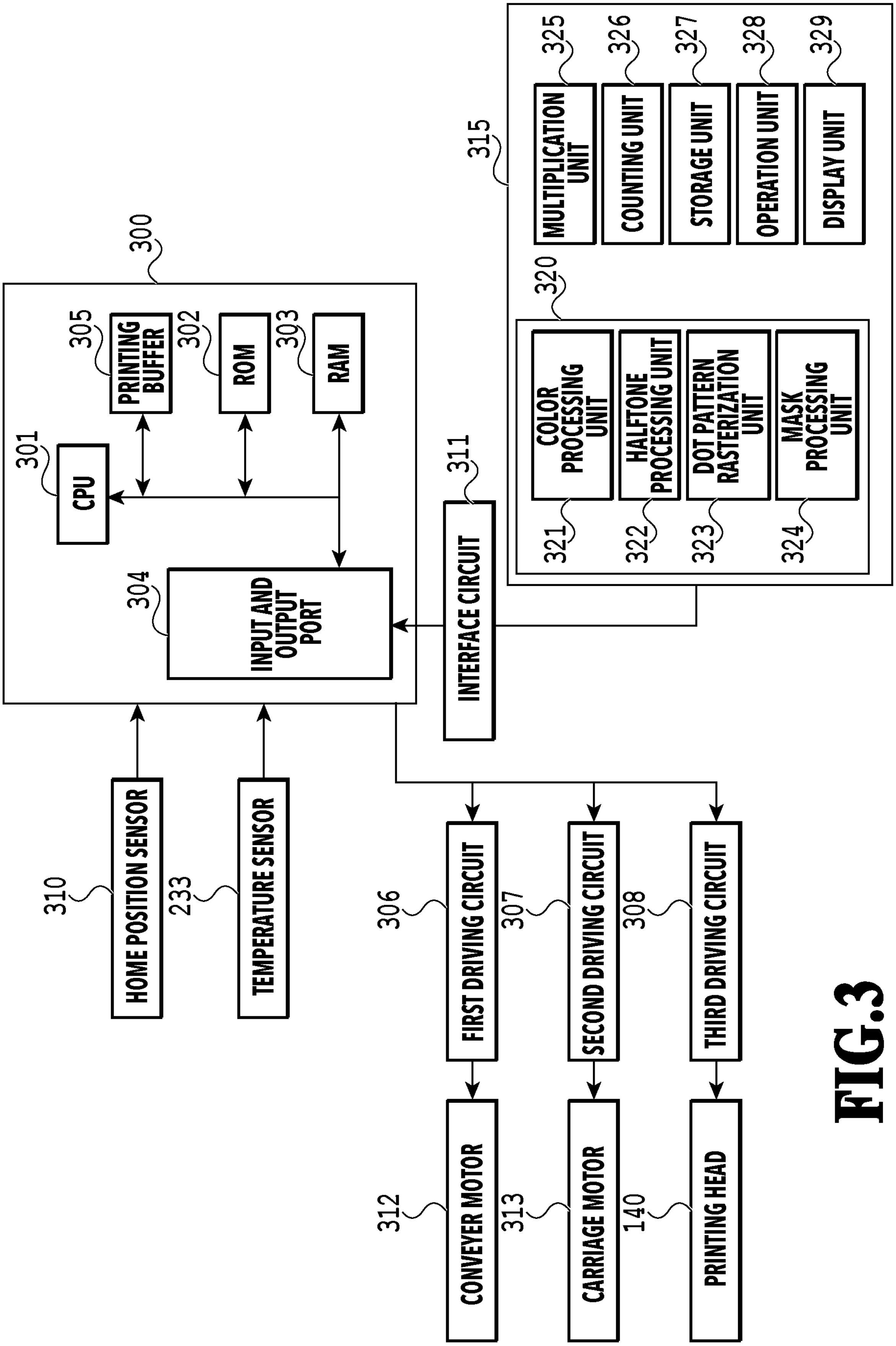
FIG. 3 is a block diagram describing the configuration of the printing apparatus.

FIG. 3 is a block diagram describing a configuration of control in the printing apparatus 100. As illustrated in FIG. 3, in addition to the above-described printing head 140 and temperature sensor 233, the printing apparatus 100 includes the main controller unit 300 as a printing control device, a first driving circuit 306, a second driving circuit 307, and a third driving circuit 308. Additionally, the printing apparatus 100 includes a home position sensor 310, an interface circuit 311, a conveyer motor 312, and the carriage motor 313.

The main controller unit 300 mainly includes a CPU 301 (which may be an ASIC) as a calculation unit and also includes a ROM 302, a RAM 303, an input and output port 304, and a printing buffer 305. For example, the main controller unit 300 controls the conveyer roller (not illustrated) as a conveyer unit that conveys the printing head 140, the carriage 130, and the printing medium P in accordance with multiple printing modes (described later) of different image printing qualities. In accordance with various programs and parameters stored in the ROM 302, the main controller unit 300 controls the overall printing apparatus 100 while using the RAM 303 as a working area. A mask pattern and the like described later are also stored in the ROM 302. The first driving circuit 306 drives the conveyer motor 312 for rotating the conveyer roller (not illustrated) under an instruction of the main controller unit 300. Note that, the conveyer motor 312 is able to be rotated reversely and allows for control of a conveyance amount. The second driving circuit 307 drives the carriage motor 313 for moving the carriage 130 under an instruction of the main controller unit 300. The third driving circuit 308 drives the printing head 140 to perform the printing operation under an instruction of the main controller unit 300.

Additionally, the input and output port 304 is connected to a kind of sensor such as the temperature sensor 233 that detects a temperature of the printing head 140 and the home position sensor 310 that detects that the carriage 130 is in a position of a home position in which the recovery operation is performed. Moreover, the main controller unit 300 is connected to a host computer 315 through the interface circuit 311.

The host computer 315 includes a printer driver 320, a multiplication unit 325, a counting unit 326, a storage unit 327, an operation unit 328, and a display unit 329. The printer driver 320 includes a color processing unit 321, a halftone processing unit 322, a dot pattern rasterization unit 323, and a mask processing unit 324. For example, the main controller unit 300 performs predetermined image processing in accordance with the program stored in the ROM 302 on image data received from the host computer 315 through the interface circuit 311. With this, ejection data printable by the printing head 140 is generated, and the generated ejection data is temporarily saved in the RAM 303. Then, based on the printing mode designated by a job received from the host computer 315 and the program stored in the ROM 302, the main controller unit 300 sequentially calls the ejection data saved in the RAM 303. The main controller unit 300 then executes the printing operation by driving the printer driver 320.

Note that, a communication unit of the interface circuit 311 or the host computer 315 may be wired or wireless. Additionally, the host computer 315 may be information equipment such as a smartphone or a tablet. Moreover, the multiplication unit 325 and the counting unit 326 as software included in the host computer 315 are stored in the ROM 302 through the interface circuit 311 and the input and output port 304. Furthermore, the main controller unit 300 (the CPU 301) can read a table (described later with reference to FIG. 10) stored in the storage unit 327. With this, the CPU 301 can execute multiplication processing (described later) and counting processing (described later). For example, the CPU 301 can calculate an amount of the ink used for printing by multiplying the printing dot number by an ejection amount conversion factor (V) (described later) per dot corresponding to a temperature of the printing head 140.

«Description of Rasterization Processing into Printing Data from Printer Driver 320»

The image data to be processed by the printer driver 320 installed in the host computer 315 is inputted to the color processing unit 321 as image data of RGB of 8 bits each (that is, a total of 24 bits). The color processing unit 321 performs color gamut conversion from a color gamut of a standard RGB color space of the image data by using a profile (table) corresponding to the printing mode (described later). Next, the color processing unit 321 performs color separation on the RGB image data obtained by the color gamut conversion by using a color conversion table (not illustrated). That is, the color processing unit 321 converts the image data of RGB into image data (ink application amount data) corresponding to the ink color (for example, black (Bk)) used in the printing apparatus 100. The halftone processing unit 322 performs pseudo-halftone process (halftoning processing) such as error diffusion on the inputted ink of a multilevel signal of 12 bits and 4096 values to convert into binary data with less values than 4096 values. With this processing, the dot pattern rasterization unit 323 obtains binary data corresponding to signal values (pixel values) in which a pixel (dot) colored in black is ON and a white pixel (dot) is OFF. Next, the mask processing unit 324 divides the binary data of each ink obtained by the dot pattern rasterization unit 323 into data corresponding to multiple times of scanning of the printing head 140 on the same printing region. In this processing, processing is performed by using a thinning pattern (hereinafter, also referred to as a mask pattern). The mask processing unit 324 generates printing data by performing mask processing on the data of the ink color.

«Setting of Printing Mode»

Figure 4:
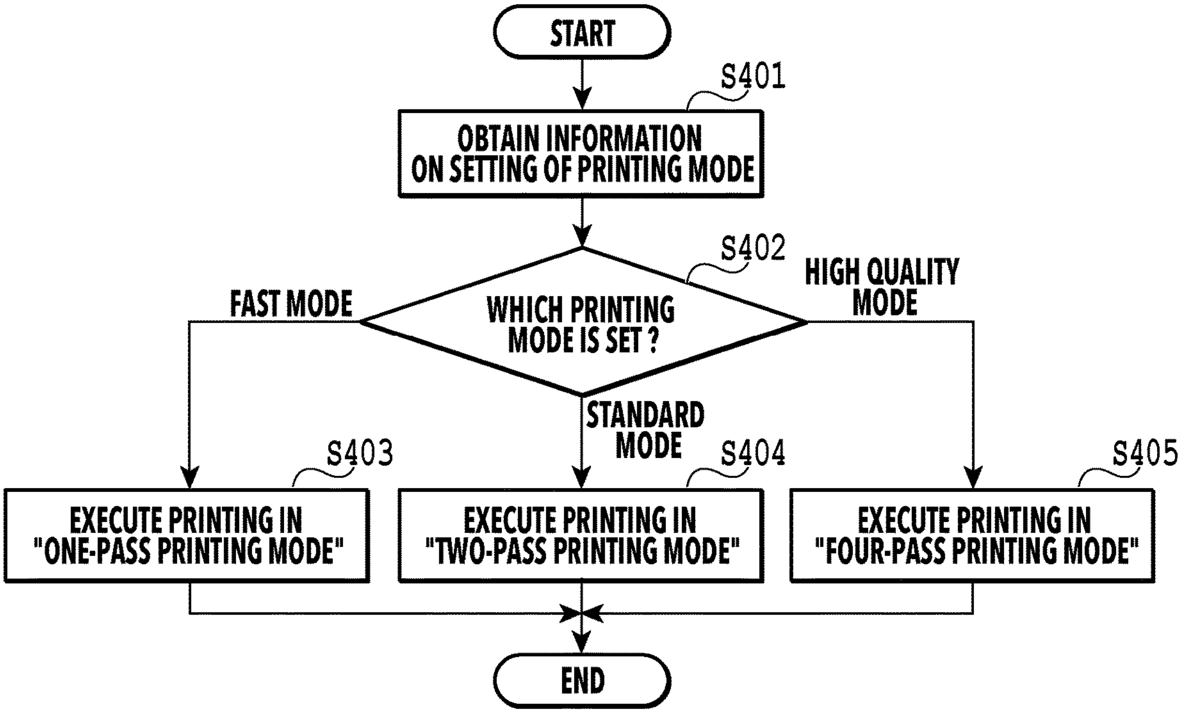
FIG. 4 is a flowchart illustrating a flow of a printing operation performed by the printing apparatus.

FIG. 4 is a flowchart illustrating a flow of the printing operation performed by the printing apparatus 100 of the present embodiment. Note that, the processing illustrated in the flowchart of FIG. 4 is, for example, implemented by the above-described CPU 301 reading and executing the program stored in a memory such as the ROM 302 into the RAM 303. "S" described in the following descriptions means a step. In S401, the CPU 301 obtains information on setting of the printing mode in accordance with a type of a radio button (see FIG. 5) selected by the user.

Figure 5:
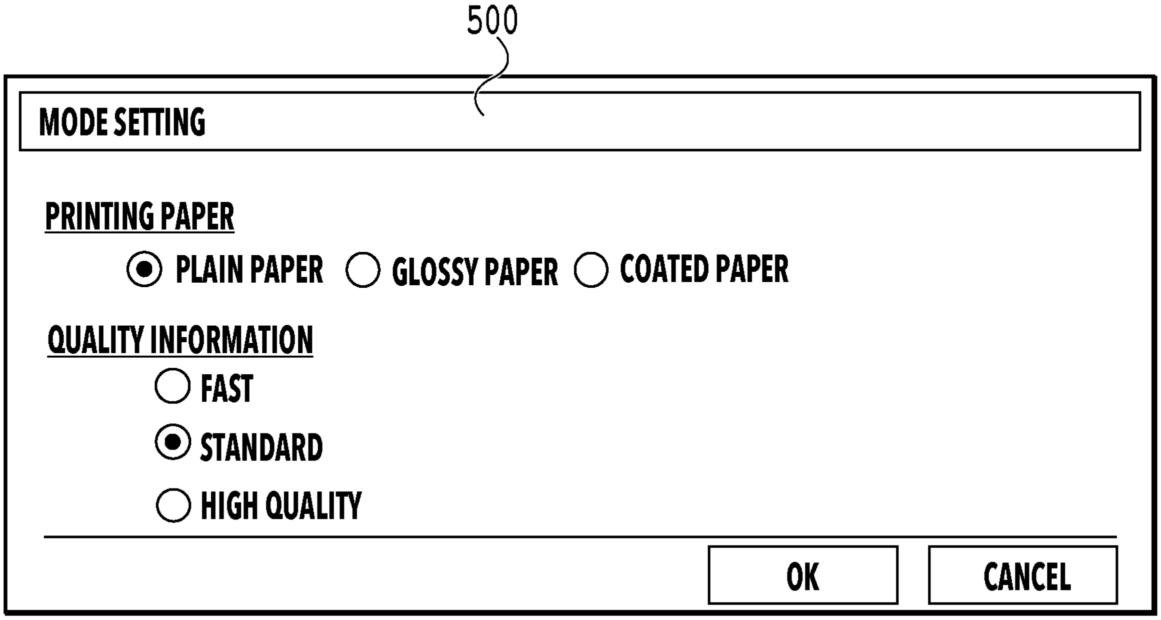
FIG. 5 is a diagram illustrating an example of a mode setting screen.

FIG. 5 is a diagram illustrating an example of a mode setting screen 500 used for setting of the printing mode. For example, the mode setting screen 500 is displayed as a display screen of the printer driver 320 on the display unit 329 included in the host computer 315. As illustrated in FIG. 5, the mode setting screen 500 includes radio buttons for selecting a type of the printing medium P (for example, printing paper). The illustrated example illustrates an example of a case where the user selects "plain paper" by using the operation unit 328. Additionally, the mode setting screen 500 includes radio buttons for selecting a printing quality.

Note that, "fast" illustrated as quality information in FIG. 5 is a printing mode to put priority on the speed of printing rather than the image quality. Hereinafter, the printing mode is referred to as a "fast mode" as needed. "Standard" is a printing mode to put more priority on the image quality than "fast mode"; however, the printing speed is slower than "fast mode". "High quality" is a printing mode to put more priority on the image quality than "standard mode"; however, the printing speed is slower than "standard mode".

For example, "fast mode" and "high quality mode" at least have different conveyance speeds or conveyance amounts by the conveyer unit during the printing operation. Specifically, "fast mode" has a faster conveyance speed or a greater conveyance amount by the conveyer unit during the printing operation than that of "high quality mode".

The illustrated example illustrates an example where the user selects "standard mode" by using the operation unit 328. The information on the printing paper selected by the user is set as printing medium information to the printer driver 320 included in the host computer 315. Additionally, the information on the printing quality selected by the user is set as printing quality information to the printer driver 320 included in the host computer 315.

Referring back to FIG. 4, in S402, the CPU 301 assigns processing according to which printing mode is set in S401. If "fast mode" is set, the processing proceeds to S403. If "standard mode" is set, the processing proceeds to S404. If "high quality mode" is set, the processing proceeds to S405. In and after S403, the printing operation for a unit region of the printing medium P according to the set printing mode is executed.

Figure 6A:
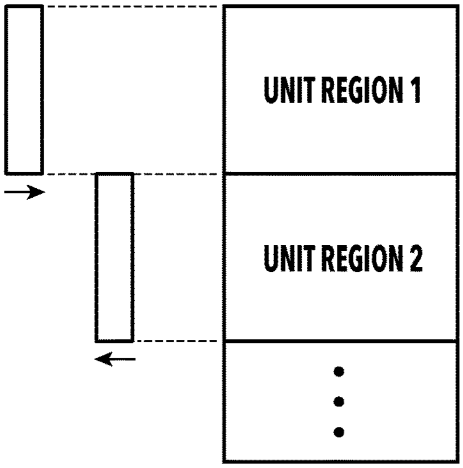
FIGS. 6A to 6C are diagrams describing a printing method.
Figure 6B:
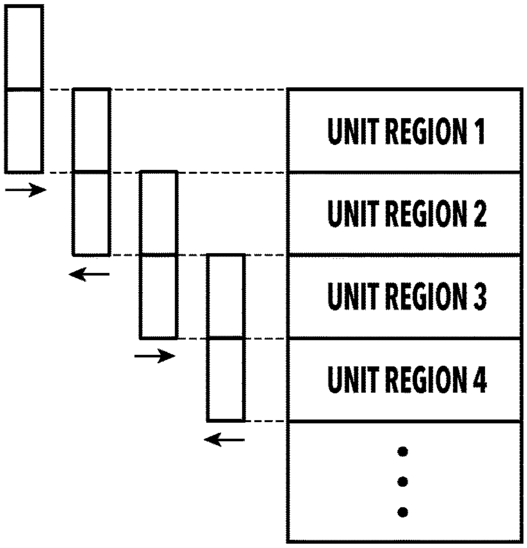
Figure 6C:
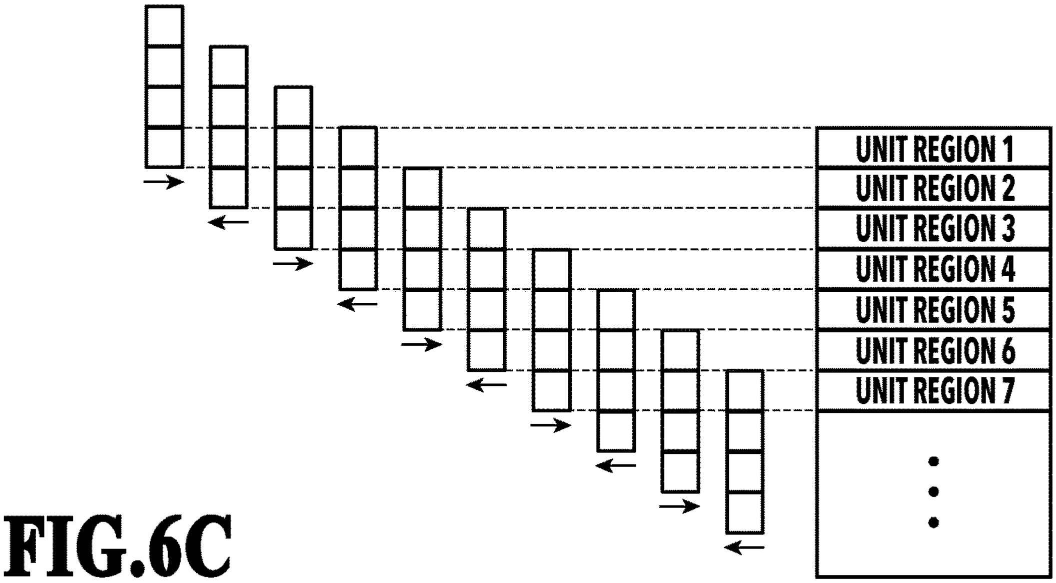

FIGS. 6A to 6C are diagrams describing a printing method for the unit region of the printing medium P. In the above-described ROM 302, a table (not illustrated) in which the printing quality information and the number of passes during the printing operation are associated with each other is stored in advance. Then, the CPU 301 determines the number of passes during the printing operation in and after S403 with reference to the table. In the present embodiment, in accordance with the information on the printing mode obtained in S401, printing is performed for the unit region of the printing medium P by one time or multiple times of scanning. Hereinafter, the printing mode in which printing is performed on the unit region of the printing medium P by one time of scanning is referred to as "one-pass printing mode" as needed. Additionally, the printing mode in which printing is performed on the unit region of the printing medium P by multiple times of scanning is referred to as "multipass printing mode" as needed.

In the present embodiment, processing of printing with multiple passes in a predetermined region including multiple unit regions on the printing medium is executed by using the printing head 140. Specifically, in a case where "fast mode" is set, the printing operation in "one-pass printing mode" is executed. On the other hand, in a case where "standard mode" or "high quality mode" is set, the printing operation in "multipass printing mode" is executed. More specifically, in a case where "standard mode" is set, the printing operation in "two-pass printing mode" is executed. In a case where "high quality mode" is set, the printing operation in "four-pass printing mode" is executed.

Additionally, in the present embodiment, the printing head 140 is scanned N times (N is an integer) on the same region (a region having a width obtained by dividing a width of the printing head 140 in the y direction by N) in the printing medium P, and an image to be printed on the above-described same region is completed by the N times of scanning. Hereinafter, the width in the printing head 140 in the y direction is referred to as a "printing head width" as needed.

FIG. 6A illustrates an example of "one-pass printing mode". In "one-pass printing mode", the printing head 140 is scanned one time on a unit region having the same width as the printing head width, and an image to be printed on the above-described unit region is completed by the one time of scanning. That is, in "one-pass printing mode", printing is performed putting priority to the printing speed rather than the image quality. FIG. 6B illustrates an example of "two-pass printing mode". In "two-pass printing mode", the printing head 140 is scanned two times on a unit region having a width obtained by dividing the printing head width into two, and an image to be printed on the above-described same region is completed by the two times of scanning. That is, in "two-pass printing mode", printing is performed while satisfying both the image quality and printing speed. FIG. 6C illustrates an example of "four-pass printing mode". In "four-pass printing mode", the printing head 140 is scanned four times on a unit region having a width obtained by dividing the printing head width into four, and an image to be printed on the above-described same region is completed by the four times of scanning.

That is, "four-pass printing mode" can be said that it is a printing mode that puts priority to an accuracy of printing more than "two-pass printing mode" does by setting more numbers of passes for printing than that of "two-pass printing mode". In other words, in "four-pass printing mode", time required for printing is longer than that of "two-pass printing mode". However, in "four-pass printing mode", it is possible to perform printing with better image quality than "two-pass printing mode". Referring back to FIG. 4.

In S403, the CPU 301 transmits a control signal for performing printing in "one-pass printing mode" to the printing head 140. In a case where the printing head 140 receives the control signal, the printing head 140 completes an image to be printed on the above-described unit region by one time of scanning. That is, in the present step, printing in "one-pass printing mode" is executed.

In S404, the CPU 301 transmits a control signal for performing printing in "two-pass printing mode" to the printing head 140. In a case where the printing head 140 receives the control signal, the printing head 140 completes an image to be printed on the above-described unit region by two times of scanning. That is, in the present step, printing in "two-pass printing mode" is executed.

In S405, the CPU 301 transmits a control signal for performing printing in "four-pass printing mode" to the printing head 140. In a case where the printing head 140 receives the control signal, the printing head 140 completes an image to be printed on the above-described unit region by four times of scanning. That is, in the present step, printing in "four-pass printing mode" is executed. Once the printing on the printing medium P ends, the present flow ends. The above is the general process of control performed by the CPU 301.

«Gradation Mask»

A mask for multiple passes used in "multipass printing mode" in a case where "standard mode" or "high quality mode" is set in the present embodiment is described below. There are two types of the mask for multiple passes: "flat mask" and "gradation mask". In the present embodiment, in a case where "standard mode" is set, "flat mask" is used. On the other hand, in a case where "high quality mode" is set, "gradation mask" is used. First, "gradation mask" is described. The gradation mask is produced such that the mask number is increased from the ejection ports 235 in the center portion of the ejection port arrays 220 of the printing head 140 toward the ejection ports 235 in the two end portions. That is, the gradation mask is a mask that is set such that the ejection frequencies of the ejection ports 235 are reduced from the ejection ports 235 in the center portion of the ejection port arrays 220 of the printing head 140 toward the ejection ports 235 in the two end portions. Additionally, in the above-described S405, the four-pass printing is performed on the printing medium P by using the gradation mask. Note that, the gradation mask is used in a case of performing printing by multiple times of scanning of the printing head 140 on the same region (unit region) in the printing medium P so as to divide the image data corresponding to the same region into image data to be printed by each of the multiple times of scanning.

Figure 7:
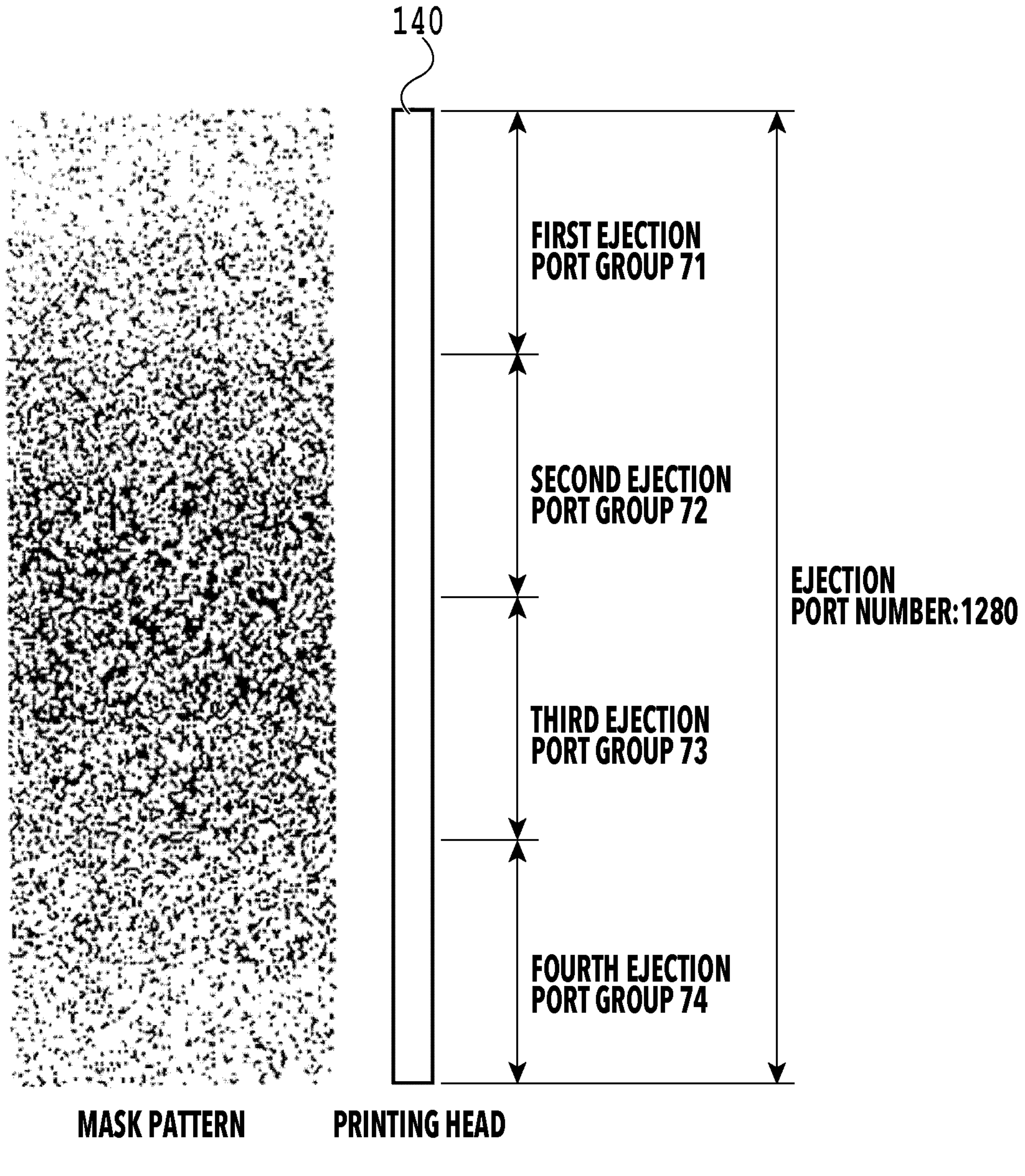
FIG. 7 is a diagram illustrating an example of a mask pattern.

FIG. 7 is a diagram illustrating an example of a mask pattern in the gradation mask. As illustrated in FIG. 7, in the present embodiment, the 1280 ejection ports 235 are divided into four ejection port groups. For example, 1st to 320th ejection ports 235 are included in a first ejection port group 71. Subsequently, 321st to 640th ejection ports 235 are included in a second ejection port group 72. Additionally, 641st to 960th ejection ports 235 are included in a third ejection port group 73. Finally, 961st to 1280th ejection ports 235 are included in a fourth ejection port group 74.

The mask pattern is associated with each of the ejection ports 235 included in the printing head 140 and has a role in regulation of the printing position of each ejection port 235. A black-colored area in the mask pattern indicates a position in which printing is permitted. On the other hand, a white-colored area indicates a position in which printing is not permitted. Additionally, mask patterns corresponding to the first ejection port group 71, the second ejection port group 72, the third ejection port group 73, and the fourth ejection port group 74, respectively, have a mutual complementary relationship. With these mask patterns being overlapped with each other, all the printing positions are encompassed. Accordingly, with ejection of the ink on the same region (unit region) in the printing medium P by using each of the first ejection port group 71, the second ejection port group 72, the third ejection port group 73, and the fourth ejection port group 74 once, it is possible to complete an image to be printed on the same region.

A feature of the mask pattern in FIG. 7 is that an ejection ratio is gradually reduced from the ejection ports 235 in the center portion of the ejection port arrays 220 toward the ejection ports 235 in the end portions. That is, the ejection frequencies of the ejection ports 235 included in the second ejection port group 72 and the third ejection port group 73 positioned in the center portion of the ejection port arrays 220 are high. However, the ejection frequencies of the ejection ports 235 included in the first ejection port group 71 and the fourth ejection port group 74 positioned on the sides of the end portions of the ejection port arrays 220 are low. A relationship of Y<X holds where the ejection ratio of the ejection ports 235 positioned in the center portion is X % and the ejection ratio of the ejection ports 235 positioned on the sides of the end portions is Y %. Then, the ejection ratio of the ejection ports 235 is reduced in stages from X % to Y % from the center portion toward the sides of the two end portions in the ejection port arrays 220.

Note that, the ejection ratio (ejection frequencies) of the mask pattern is a value expressing in percentage a ratio of the number of print permission areas with respect to the total number of print permission areas (black-colored areas) and print non-permission areas (white-colored areas) forming the mask pattern. For example, it is assumed that the size of the illustrated mask pattern in a transverse direction is 256 areas. In this case, the total number of the print permission areas and the print non-permission areas forming the mask pattern corresponding to each of the ejection ports 235 is 256. It is assumed that, out of the 256 areas, the number of the print permission areas is 64, and the number of the print non-permission areas is 192. In this case, the ejection ratio of the mask pattern corresponding to the ejection ports 235 is 25% (64/192×100=25%).

The flat mask used in "standard mode" in the present embodiment is described below. The flat mask is a mask that is set such that the ejection frequencies of the ejection ports 235 in the ejection port arrays 220 are the same. A relationship of Y=X holds where the ejection ratio of the ejection ports 235 positioned in the center portion of the ejection port arrays 220 is X % and the ejection ratio of the ejection ports 235 on the sides of the end portions is Y %. In "standard mode" of the present embodiment, printing is completed with two passes. Thus, the ejection ratio of the print permission areas and the print non-permission areas is 50%.

In this case, taking into consideration the image quality, originally, "four-pass printing mode" achieves better image quality than "two-pass printing mode" does. However, "two-pass printing mode" in the above-described S404 has a relatively low density comparing with "four-pass printing mode". Thus, in "two-pass printing mode", even if there occurs degradation in granularity, joining stripe, or the like, the granularity, joining stripe, or the like is minor degradation comparing with "four-pass printing mode". Thus, even if the flat mask is used but not the gradation mask in "two-pass printing mode", usually a good printing result is obtained.

Figure 8:
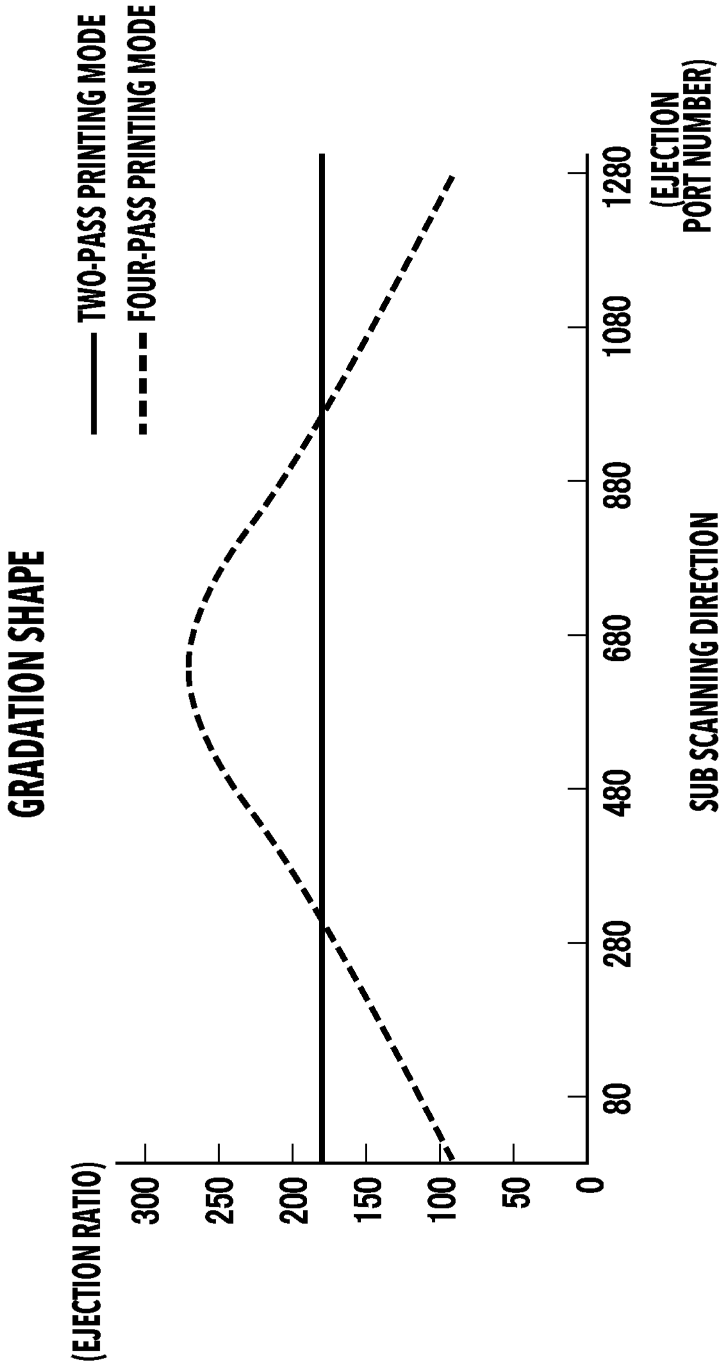
FIG. 8 is a diagram illustrating an example of a gradation shape.

FIG. 8 is a diagram graphing a mask shape used in the multipass printing mode of the present embodiment. A vertical axis of the graph illustrated in FIG. 8 indicates the ejection ratio (%) of the ink ejected from the ejection ports 235. On the other hand, a horizontal axis of the graph illustrated in FIG. 8 indicates an ejection port number of each of the existing 1280 ejection ports 235 in the present embodiment. That is, the horizontal axis in FIG. 8 indicating the ejection port number corresponds to the vertical axis in FIG. 7. On the other hand, the horizontal axis in FIG. 8 indicating the ejection ratio corresponds to the horizontal axis in FIG. 7.

Additionally, the graph illustrated with a solid line in FIG. 8 is a line obtained by graphing the shape of "flat mask" used in "two-pass printing mode". As described above, in "two-pass printing mode", the ejection frequencies of the ejection ports 235 in the ejection port arrays 220 are all the same. Thus, with the gradation shape of "flat mask" used in "two-pass printing mode" being illustrated by using a graph, the flat shape is obtained. That is, no gradient occurs in the graph of "flat mask".

On the other hand, the graph illustrated with a broken line in FIG. 8 is a line obtained by graphing the shape of "gradation mask" used in "four-pass printing mode". As described above, in "four-pass printing mode", in the ejection port arrays 220, the ejection frequencies of the ejection ports 235 positioned in the center portion are high, and the ejection frequencies of the ejection ports 235 positioned on the sides of the end portions are low. That is, as illustrated in FIG. 7, the ejection frequencies of the ejection ports 235 included in the second ejection port group 72 and the third ejection port group 73 positioned in the center portion of the ejection port arrays 220 are high. On the other hand, the ejection frequencies of the ejection ports 235 included in the first ejection port group 71 and the fourth ejection port group 74 positioned on the sides of the end portions in the ejection port arrays 220 are low. Thus, with the gradation shape of "gradation mask" used in "four-pass printing mode" being illustrated by using a graph, the hilly shape is obtained. Accordingly, a gradient occurs in the graph of "gradation mask".

«Method of Calculating Consumption Amount of Ink»

Figure 9:
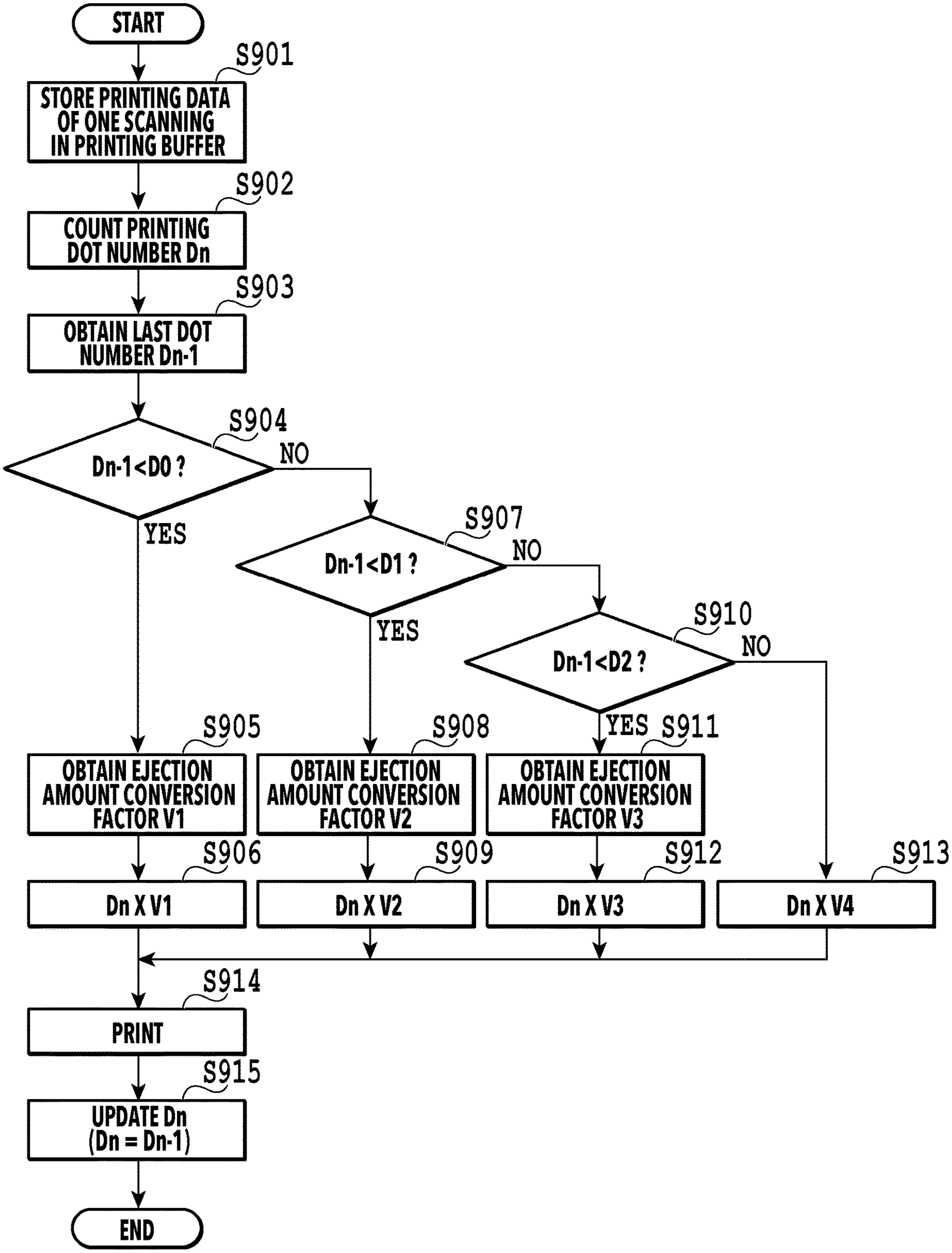
FIG. 9 is a flowchart illustrating a flow of processing to calculate a consumption amount of an ink.

FIG. 9 is a flowchart illustrating a flow of processing to calculate a consumption amount of the ink. A method of calculating the consumption amount of the ink is described below with reference to FIG. 9. "S" used in the following descriptions means a step. Additionally, the premise of the present flow is that the CPU 301 obtains the temperature of the printing head 140 detected by the temperature sensor 233.

In S901, in a case where the CPU 301 receives an instruction of printing from the host computer 315, the CPU 301 deploys printing data of one time of scanning and stores in the printing buffer 305. In S902, the CPU 301 counts a printing dot number Dn based on the printing data deployed in the printing buffer 305. In S903, the CPU 301 reads and obtains a printing dot number Dn−1 during the last printing that is saved in a buffer for temporal saving (not illustrated). The printing dot number during the last printing is, for example, a printing dot number (number of times of ejection) during scanning before the scanning this time. Note that, in a case where no printing dot number Dn−1 during the last printing is stored in the above-described buffer for temporal saving, the CPU 301 assumes that the value of the printing dot number Dn−1 is 0 and executes the processing below. For example, in a case where the printing apparatus 100 according to the present embodiment is used for first time, the CPU 301 assumes that the value of the printing dot number Dn−1 is 0. Additionally, in a case where printing is not performed for a certain time or a case where it is immediately after the recovery operation is performed, the CPU 301 assumes that the value of the printing dot number Dn−1 is 0 and executes the processing below.

In S904, the CPU 301 compares the printing dot number Dn−1 obtained in S903 with a first threshold D0. If the printing dot number Dn−1 is smaller than the first threshold D0, the processing proceeds to S905. Note that, the processing proceeds to S905 also in a case where no printing dot number Dn−1 during the last printing is stored in the above-described buffer for temporal saving. Additionally, the processing proceeds to S905 also in a case where printing is not performed for a certain time or a case where it is immediately after the recovery operation is performed. This is because, in a case where printing is not performed for a certain time or the recovery operation is performed, it can be considered that the printing head 140 is not in operation and the temperature does not rise. Alternatively, even if the temperature of the printing head 140 had risen for instance, it can be considered that the temperature has decreased. On the other hand, if the printing dot number Dn−1 is greater than the first threshold D0, the processing proceeds to S907. This is because it can be considered that the temperature of the printing head 140 rose in the last printing operation.

In S905, the CPU 301 reads and obtains a first ejection amount conversion factor V1 of each of the ejection ports 235 with reference to the table stored in the storage unit 327 (described later with reference to FIG. 10). In the table, the temperature of the printing head 140 and the ejection amount conversion factor (V) of each of the ejection ports 235 are associated with each other. After the present step ends, the processing proceeds to S906. In S906, the CPU 301 multiplies the printing dot number Dn by the first ejection amount conversion factor V1 obtained in S905. After the present step ends, the processing proceeds to S914.

In S907, the CPU 301 compares the printing dot number Dn−1 obtained in S903 with a second threshold D1. If the printing dot number Dn−1 is smaller than the second threshold D1, the processing proceeds to S908. On the other hand, in a case where the printing dot number Dn−1 is greater than the second threshold D1, the processing proceeds to S910. In S908, the CPU 301 reads and obtains a second ejection amount conversion factor V2 of each of the ejection ports 235 with reference to the above-described table. After the present step ends, the processing proceeds to S909. In S909, the CPU 301 multiplies the printing dot number Dn by the second ejection amount conversion factor V2 obtained in S908. After the present step ends, the processing proceeds to S914.

In S910, the CPU 301 compares the printing dot number Dn−1 obtained in S903 with a third threshold D2. If the printing dot number Dn−1 is smaller than the third threshold D2, the processing proceeds to S911. On the other hand, if the printing dot number Dn−1 is greater than the third threshold D2, the processing proceeds to S913. In S911, the CPU 301 reads and obtains a third ejection amount conversion factor V3 of each of the ejection ports 235 with reference to the above-described table. After the present step ends, the processing proceeds to S912. In S912, the CPU 301 multiplies the printing dot number Dn by the third ejection amount conversion factor V3 obtained in S911. After the present step ends, the processing proceeds to S914. In S913, the CPU 301 multiplies the printing dot number Dn by a fourth ejection amount conversion factor V4 with reference to the above-described table. After the present step ends, the processing proceeds to S914.

In S914, the CPU 301 executes printing on the printing medium P in accordance with the printing mode determined in S402. After the present step ends, the processing proceeds to S915. In S915, the CPU 301 updates the printing dot number Dn. Specifically, the value of the printing dot number Dn counted in S902 is saved as the value of the printing dot number Dn−1 during the last printing to the buffer for temporal saving (not illustrated). With the above, the present processing ends.

«Table Stored in Storage Unit 327»

FIG. 10 is the table illustrating a relationship between the ejection amount conversion factor (V) and the temperature of the printing head 140. As illustrated in FIG. 10, in the table, the threshold of the ejection amount (the ejection amount conversion factor (V)) is associated with each temperature of the printing head 140 detected by the temperature sensor 233 as a detection unit. In the table, the association with the ejection amount conversion factor (V), which is a ratio of an experimentally obtained variation amount in the ejection amount in accordance with the temperature rise in the printing head 140, is defined. Note that, as the temperature of the printing head 140 during the ink ejection is higher, the viscosity of the ink is reduced and the ejection amount is increased, and thus the value of the ejection amount conversion factor (V) is increased as the temperature of the printing head 140 is higher. On the other hand, as the temperature of the printing head 140 during the ink ejection is lower, the viscosity of the ink is increased and the ejection amount is reduced, and thus the value of the ejection amount conversion factor (V) is reduced as the temperature of the printing head 140 is lower. That is, the ejection amount conversion factor (V) is set to be a great value in accordance with the temperature of the printing head 140. In the present embodiment, the same ejection amount conversion factor (V) is used for a certain temperature range.

In the example in FIG. 10, an example in which the temperature of the printing head 140 is divided into four sections is illustrated, and the ejection amount conversion variable (V) associated with each section is defined. Specifically, the value of the first ejection amount conversion factor V1 is the smallest value out of the exemplified ejection amount conversion factors (V). Subsequently, the value of the second ejection amount conversion factor V2 is greater than the value of the first ejection amount conversion factor V1 but smaller than the value of the third ejection amount conversion factor V3. Subsequently, the value of the third ejection amount conversion factor V3 is greater than the value of the second ejection amount conversion factor V2 but smaller than the value of the fourth ejection amount conversion factor V4. Finally, the value of the fourth ejection amount conversion factor V4 is the greatest value out of the exemplified ejection amount conversion factors (V). That is, as the temperature of the printing head 140 is lower, the printing dot number Dn is multiplied by a smaller value. On the other hand, as the temperature of the printing head 140 is higher, the printing dot number Dn is multiplied by a greater value. For example, in a case where the temperature of the printing head 140 is a first temperature (for example, 40° C. or higher and lower than 50° C.), the ejection amount conversion factor (V2) is set to be a greater value (V2) than a value (V1) of the second temperature (lower than 40° C.) at which the temperature of the printing head 140 is lower than the first temperature.

«Determination of Method of Calculating Use Amount of Ink»

Figure 11:
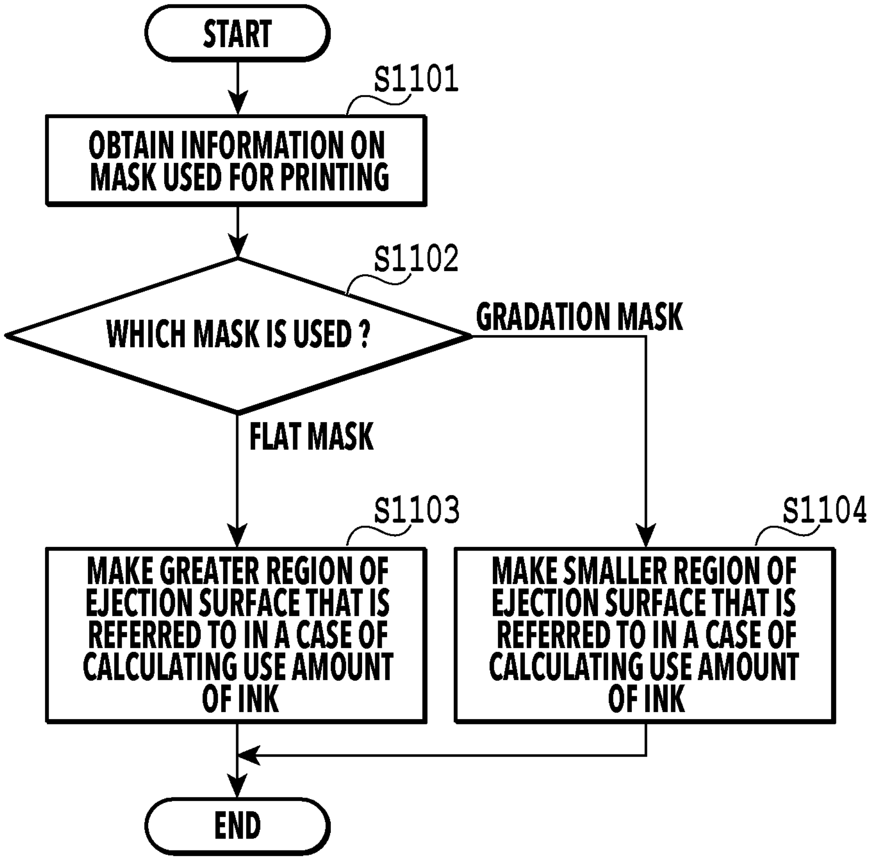
FIG. 11 is a flowchart illustrating a flow to determine a method of calculating the consumption amount of the ink.

FIG. 11 is a flowchart illustrating processing to determine a method of calculating a use amount of the ink. In a case of calculating the consumption amount of the ink in the above-described S906, S909, S912, or S913, the flow in FIG. 11 is executed, and the method of calculating the use amount of the ink is determined. Note that, the processing illustrated in the flowchart of FIG. 11 is, for example, implemented by the above-described CPU 301 reading and executing the program stored in a memory such as the ROM 302 into the RAM 303. "S" used in the following descriptions means a step.

In S1101, the CPU 301 obtains information on setting of the printing mode in accordance with the type of the radio button selected by the user. Specifically, information on the mask used for printing is obtained.

In S1102, the CPU 301 determines whether to use the flat mask or the gradation mask based on the information obtained in S1101. If the printing mode using the flat mask is set, the processing proceeds to S1103. On the other hand, if the printing mode using the gradation mask is set, the processing proceeds to S1104.

In S1103, the CPU 301 makes a region of the ejection surface provided with the multiple ejection ports 235 greater than that in a case where the printing mode using the gradation mask is set, the region being referred to as a unit of calculation in a case of calculating the amount of the ink used for printing as the calculation method. Then, the CPU 301 calculates the amount of the ink used for printing. That is, in a case where the flat mask is used, the CPU 301 calculates the use amount of the ink by using an average of two or more ejection ports 235 as a unit of multiplication. Accordingly, a length of the ejection surface in the sub scanning direction, which is referred to as a unit of calculation in a case of calculating the use amount of the ink, is made longer than a case of using the gradation mask, and thus the use amount of the ink is calculated.

In S1104, the CPU 301 makes a region of the ejection surface provided with the multiple ejection ports 235 smaller than that in a case where the printing mode using the flat mask is set, the region being referred to as a unit of calculation in a case of calculating the amount of the ink used for printing as the calculation method. Then, the CPU 301 calculates the amount of the ink used for printing.

That is, the CPU 301 uses less than two pieces (that is, one piece) of the ejection port 235 as a unit of multiplication. Accordingly, in the present step, the region of the ejection surface provided with the multiple ejection ports 235, which is referred to as a unit of calculation in a case of calculating the amount of the ink used for printing, is made smaller than a case where the printing mode using the flat mask is set.

That is, in the present step, each ejection port 235 (that is, each printing dot number Dn) is multiplied by the corresponding ejection amount conversion factor (V). In the present step, since the printing mode using the gradation mask is set, the ejection frequencies of the ejection ports 235 are reduced from the ejection ports 235 in the center portion of the ejection port arrays 220 of the printing head 140 toward the ejection ports 235 in the two end portions. That is, in the present step, since the ejection frequencies of the ejection ports 235 are different along the sub scanning direction of the ejection surface, the use amount of the ink in accordance with the ejection frequency of each ejection port 235 is calculated.

«Calculation Method in Case of Using Flat Mask»

Figure 12:
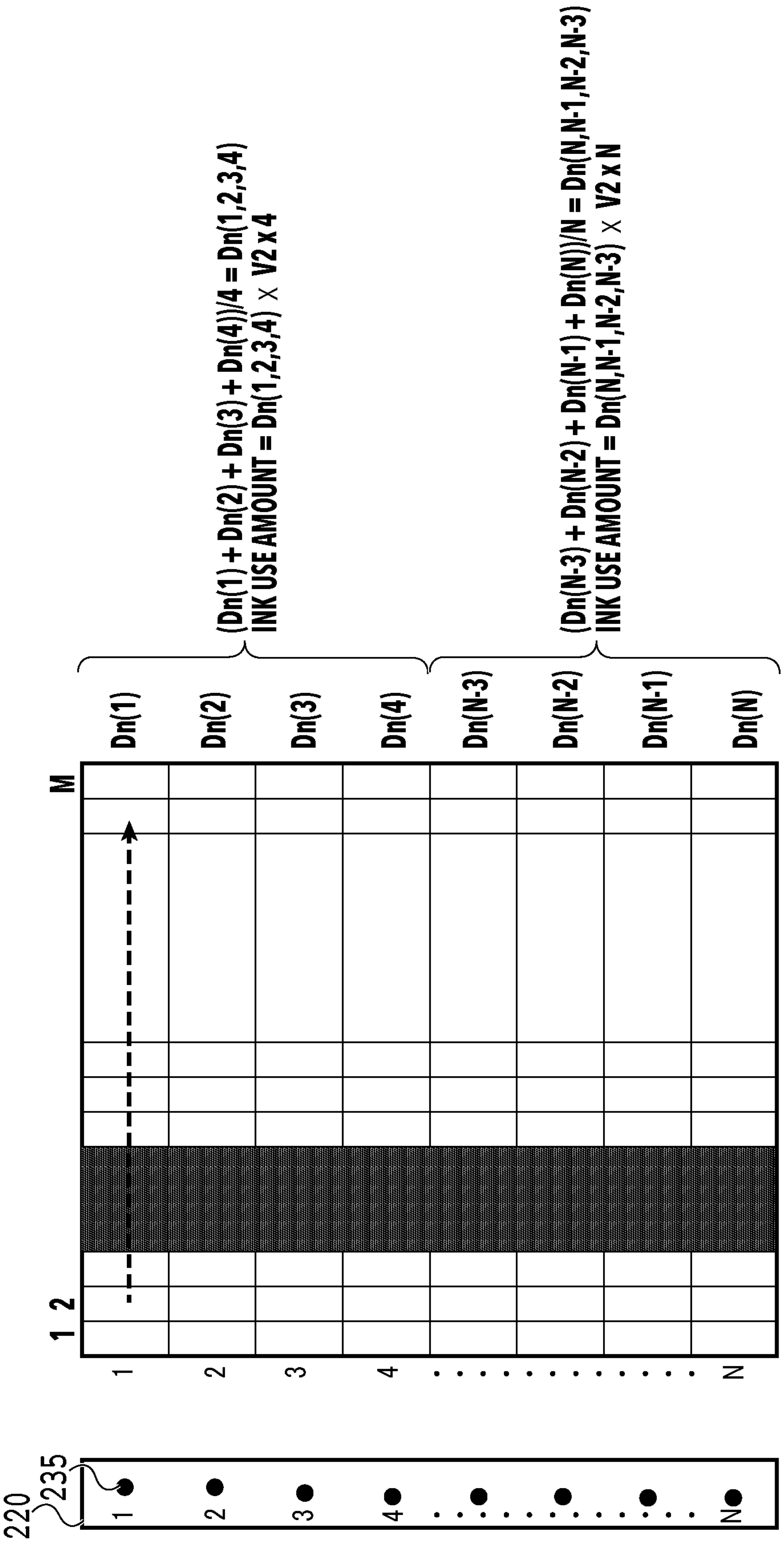
FIG. 12 is a diagram illustrating an example of a flat mask.

FIG. 12 is an explanatory diagram illustrating a method of calculating the use amount of the ink in a case of using the flat mask. For example, in the above-described S1103, the use amount of the ink is calculated by using the calculation method illustrated in FIG. 12. In the printing mode using the flat mask, the multiple ejection ports 235 are configured to eject the ink at equal ejection frequencies. In a case where the printing mode using the flat mask is set, the CPU 301 calculates an average value of the printing dot numbers Dn of the adjacent multiple ejection ports 235 and calculates the amount of the ink used for printing assuming that the average value is the value of the printing dot number Dn. Specifically, the printing dot number Dn of each ejection port 235 is counted for one to multiple numbers (N) of the existing ejection ports 235. Then, with each printing dot number Dn being multiplied by the ejection amount conversion factor (V) of each ejection port 235, the use amount of the ink is calculated.

For example, in FIG. 12, it is assumed that the use amount of the ink in the four ejection ports 235 from the top is calculated. In this case, originally, it is favorable to perform calculation based on the following Expression (1) since it is possible to calculate an accurate value.

$$\text{“}Dn(1)\times V2+Dn(2)\times V2+Dn(3)\times V2+Dn(4)\times V2\text{”} \qquad \text{Expression (1)}$$

However, in the Expression (1), in order to calculate the ink use amount in the four ejection ports 235, multiplication processing needs to be performed four times. In contrast, in the present embodiment, the average value of the printing dot numbers Dn of the adjacent ejection ports is calculated. Additionally, with the average value being assumed as the printing dot number Dn of each ejection port 235, the use amount of the ink is calculated. For example, in FIG. 12, with a use of the following Expression (2) and Expression (3), the multiplication processing for calculating the ink use amount is required only two times in order to calculate the use amount of the ink in the four ejection ports 235 from the top.

$$\text{“}Dn(1)+Dn(2)+Dn(3)+Dn(4)/N=Dn(1,2,3,4)\text{”} \qquad \text{Expression (2)}$$

$$\text{“}Dn(1,2,3,4)\times V2\times N\text{”} \qquad \text{Expression (3)}$$

Note that, processing using the Expression (2) and the Expression (3) is multiplication processing on the average of the four ejection ports 235. Thus, originally, the processing using the Expression (2) and the Expression (3) cannot calculate an accurate value comparing with the Expression (1). However, in a case of using the flat mask, there is only a small difference between the ejection frequencies of the adjacent ejection ports. Thus, even if the average value is used, a substantially accurate ink use amount can be calculated, and also calculation processing can be reduced. Additionally, a total use amount of the ink can be calculated by performing the above-described processing using the average value for all the number of the ejection ports 235(N).

With this, the number of times of determination and the number of times of multiplication of the ejection amount conversion factor (V) of each ejection port 235 by which the printing dot number Dn is multiplied are reduced. Thus, the processing speed to calculate the use amount of the ink is improved. Additionally, accurate detection of remaining amount is possible also in a case where temperatures are greatly different between ejection ports such as a case where continuous processing is performed in only a specific ejection port 235. Note that, in FIG. 12, the average value is calculated between adjacent four ejection ports; however, the calculation amount to calculate the use amount of the ink may be reduced by taking an average between more ejection ports. With this, it is possible to further improve the processing speed.

That is, in the present embodiment, based on the printing dot number and the ejection amount conversion factor corresponding to the temperature of the printing head 140, the processing to calculate the amount of the ink used to perform the printing based on the printing data is executed. Additionally, in this process, different calculation methods are used between a case where the printing mode using the "flat mask" is set and a case where the printing mode using "gradation mask" is set. With this, it is possible to calculate the use amount of the ink used for printing in accordance with the set printing mode.

«Calculation Method in Case of Using Gradation Mask»

Figure 13:
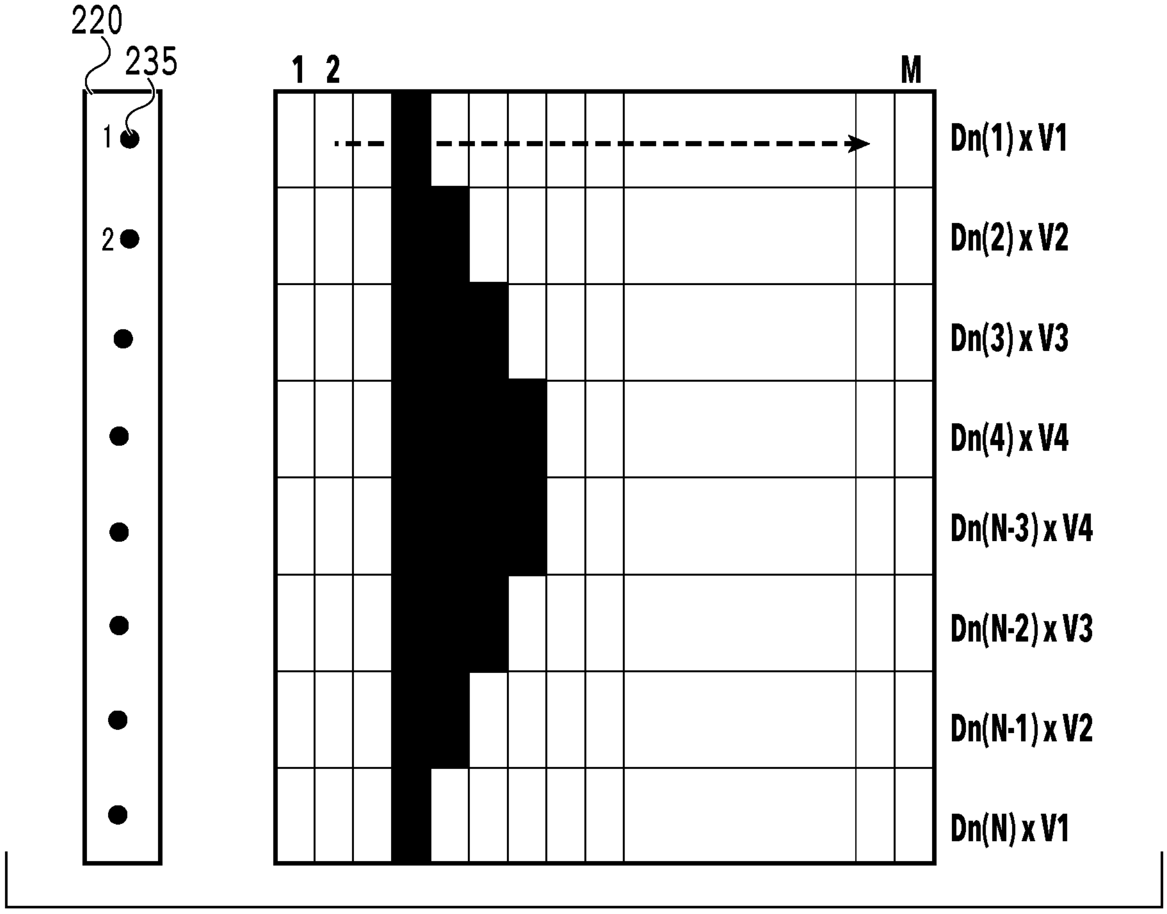
FIG. 13 is a diagram illustrating an example of a gradation mask.

FIG. 13 is an explanatory diagram illustrating a method of calculating the use amount of the ink in a case where the printing mode using the gradation mask is set. For example, in the above-described S1104, the use amount of the ink is calculated by using the calculation method illustrated in FIG. 13. In this case, the CPU 301 makes a region of the ejection surface provided with the multiple ejection ports 235 smaller than that in a case where the printing mode using the flat mask is set, the region being referred to as a unit of calculation in a case of calculating the amount of the ink used for printing as the calculation method. Then, the CPU 301 calculates the amount of the ink used for printing. As illustrated in FIG. 13, the use amount of the ink of the entire printing apparatus 100 is calculated by accumulating all the values obtained by multiplying each ejection port 235 (that is, each printing dot number Dn) by the corresponding ejection amount conversion factor (V).

The gradation mask is configured such that the ejection frequencies of the ejection ports 235 provided in the center portion in the ejection port group including the multiple ejection ports 235 are high, and the ejection frequencies of the ejection ports provided on the sides of the end portions in the ejection port group are low. Thus, if the average of the adjacent ejection ports 235 is obtained as with the case of using the flat mask, the calculation accuracy is reduced. Accordingly, as illustrated in FIG. 13, the use amount of the ink can be calculated accurately by counting the printing dot number Dn corresponding to each ejection port 235, multiplying the printing dot number Dn by the corresponding ejection amount conversion factor (V), and accumulating the results of multiplication. For example, in FIG. 13, the first and Nth ejection ports 235 have low ejection frequencies since they are positioned in the end portions of the ejection port arrays 220. Thus, the first printing dot number Dn(1) and the Nth printing dot number Dn(N) in FIG. 13 are multiplied by the first ejection amount conversion factor V1. Subsequently, the second printing dot number Dn(2) and the N−1th printing dot number Dn(N−1) in FIG. 13 are multiplied by the second ejection amount conversion factor V2. Subsequently, the third printing dot number Dn(3) and the N−2th printing dot number Dn(N−2) in FIG. 13 are multiplied by the third ejection amount conversion factor V3. Finally, the fourth printing dot number Dn(4) and the N−3th printing dot number Dn(N−3) in FIG. 13 are multiplied by the fourth ejection amount conversion factor V4.

According to the multiplication method, as the ejection ports 235 are positioned closer to the sides of the end portions of the ejection surface, the use amount of the ink is calculated such that the ejection amount of the ink is smaller. On the other hand, as the ejection ports 235 are positioned closer to the center portion of the ejection surface, the use amount of the ink is calculated such that the ejection amount of the ink is greater. Additionally, with all the values calculated by the method being accumulated, it is possible to calculate a total use amount of the ink in the entire printing apparatus 100 taking into consideration the ejection amount of each ejection port 235. In this case, the printing mode using the gradation mask is the multipass printing mode (for example, four-pass mode) emphasizing the image quality such as "high quality mode". Thus, in the printing mode, since the multiple passes are used in the first place, image formation requires time. Accordingly, it is unnecessary to forcedly increase the calculation speed of the use amount of the ink.

«Conclusion»

According to the printing apparatus 100 of the present disclosure, in a case of calculating the use amount of the ink, the size of the region of the ejection surface, which is referred to as a unit of calculation in a case of calculating the amount of the ink used for printing, is changed in accordance with the set printing mode. Additionally, in the printing mode using the flat mask, since there is no big difference in the ejection frequencies of the ejection ports 235, the average value of the printing dot numbers Dn of the ejection ports 235 is multiplied by the ejection amount conversion factor (V) of a constant value.

Moreover, in the printing mode using the gradation mask, taking into consideration the difference in the ejection frequencies of the ejection ports 235, the dot number Dn of the ejection port 235 with a high ejection frequency (that is, the temperature is likely to be increased) is multiplied by the ejection amount conversion factor of a relatively great value. On the other hand, the printing dot number Dn of the ejection port 235 with a low ejection frequency (that is, the temperature is unlikely to be increased) is multiplied by the ejection amount conversion factor of a relatively small value.

According to the above configuration, it is possible to flexibly calculate the ejection amount of the ink in accordance with the temperature of the printing head 140. Additionally, with the use amount of the ink being calculated, it is possible to calculate also the remaining amount of the ink in the ink tank 210.

Second Embodiment

In the following descriptions, a configuration that is similar to or corresponds to the embodiment 1 is provided with the same reference numeral while omitting the description, and the different points are mainly described. In the present embodiment, an object is to provide the printing apparatus 100 capable of flexibly changing the method of calculating the consumption amount of the ink in accordance with a degree of the gradation. In order to achieve the object, if a slope of a graph does not exceed a predetermined value in a case where the shape of the gradation mask is illustrated by using the graph, the CPU 301 according to the present embodiment calculates an average value of the printing dot numbers Dn of the adjacent multiple ejection ports. Additionally, the amount of the ink used for printing is calculated assuming that the average value is the value of the printing dot number Dn.

Figure 14:
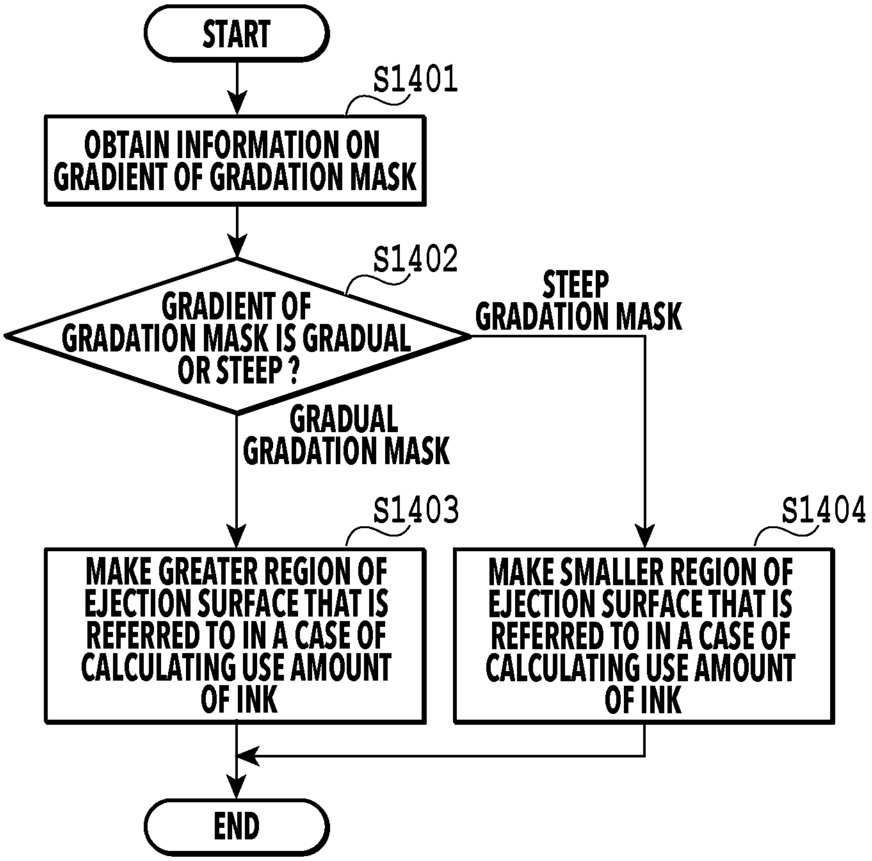
FIG. 14 is a flowchart illustrating a flow to determine the method of calculating the consumption amount of the ink.

FIG. 14 is a flowchart illustrating processing to determine the method of calculating the use amount of the ink according to the present embodiment. In S1401, the CPU 301 obtains the information on the setting of the printing mode in accordance with the type of the radio button selected by the user. Specifically, the CPU 301 obtains the information on a slope (gradient) of the graph in a case of graphing the shape of the gradation mask used for printing. In the present embodiment, in a case where "standard mode" is set, a printing operation using a gradual gradation mask (described later) with two passes is performed. On the other hand, in a case where "high quality mode" is set, a printing operation using a steep gradation mask (described later) with four passes is performed. In S1402, based on the information obtained in S1401, the CPU 301 determines whether to use the gradual gradation mask or the steep gradation mask in a case of performing the printing operation. If the gradual gradation mask is used, the processing proceeds to S1403. On the other hand, if the steep gradation mask is used, the processing proceeds to S1404.

Figure 15:
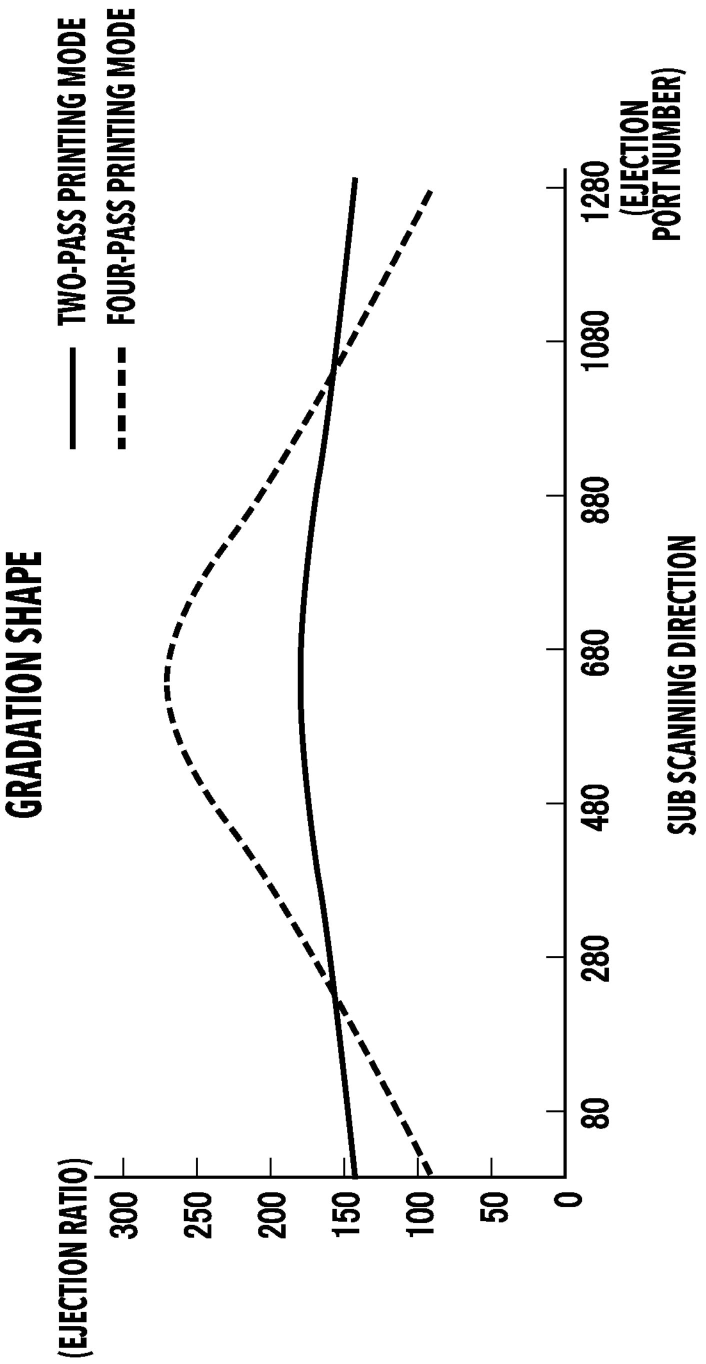
FIG. 15 is a diagram illustrating an example of the gradation shape.

FIG. 15 is a diagram describing a gradation shape of the gradual gradation mask and a gradation shape of the steep gradation masks in the present embodiment. The graph illustrated with a solid line in FIG. 15 illustrates the gradation shape of the gradual gradation mask in the present embodiment. In the present embodiment, in a case where "standard mode" (two-pass printing mode) is set, in the ejection port arrays 220, a difference in the ejection frequencies between the ejection ports 235 provided in the two end portions thereof and the ejection ports 235 provided in the center portion thereof is less than a case where "high quality mode" of the present embodiment is selected. With this, a slope of the graph indicating the shape of the mask used in "standard mode" of the present embodiment is a more gradual gradient than that in the graph illustrated with a broken line in FIG. 15. Hereinafter, the mask used in "standard mode" of the present embodiment is referred to as "gradual gradation mask" as needed. Here, "gradual gradation mask" is defined as a gradation mask in which the maximum value of the slope of the graph is smaller than 1/4. A value indicating the slope of the graph is obtained by "print permission rate/ejection port number". That is, in the present embodiment, whether the shape of the mask can be said to be a gradual gradient or steep is determined based on the slope of the graph. The graph illustrated with a solid line in FIG. 15 has an ejection ratio that is increased by about 5% as the ejection port number is increased by 100 pieces. Additionally, after the 640th ejection port 235, the ejection ratio is reduced by 5% as the ejection port number is increased by 100 pieces. Accordingly, the slope of the mask used in "two-pass printing mode" is about 1/20 (print permission rate (about 5%)/ejection port number (100 pieces)=about 1/20). Thus, the mask used in "two-pass printing mode" can be said to be a "gradual gradation mask".

On the other hand, the graph illustrated with a broken line in FIG. 15 illustrates the gradation shape of the steep gradation mask in the present embodiment. In the present embodiment, in a case where "high quality mode" (four-pass printing mode) is set, in the ejection port arrays 220, a difference in the ejection frequencies between the ejection ports 235 provided in the two end portions and the ejection ports 235 provided in the center portion is greater than a case where "standard mode" of the present embodiment is selected. With this, the slope of the graph indicating the shape of the mask used in "high quality mode" of the present embodiment is steep. Hereinafter, the mask used in "high quality mode" of the present embodiment is referred to as "steep gradation mask" as needed. Here, "steep gradation mask" in the present embodiment is defined as "gradation mask in which the maximum value of the slope of the mask exceeds 1/4". The graph illustrated with a broken line in FIG. 15 has an ejection ratio that is increased by about 100% as the ejection port number is increased by 200 pieces. Additionally, after the 640th ejection port 235, the ejection ratio is reduced by about 100% as the ejection port number is increased by 200 pieces. Accordingly, the slope of the mask used in "four-pass printing mode" is about 1/2 (print permission rate (about 100%)/ejection port number (200 pieces)=about 1/2). That is, the slope of the gradation mask of "four-pass printing mode" exceeds 1/4. Accordingly, the gradation mask of "four-pass printing mode" can be said to be a "steep gradation mask".

Referring back to FIG. 14, in S1403, the CPU 301 makes the region of the ejection surface provided with the multiple ejection ports 235 greater than that in a case where the printing mode using the steep gradation mask is set, the region being referred to as a unit of calculation in a case of calculating the amount of the ink used for printing. The mask used in "two-pass printing mode" of the present embodiment is "gradual gradation mask". Thus, a change of the printing rate in the sub scanning direction in the ejection surface is small. Accordingly, even if the number of the printing dot numbers Dn used for calculating the use amount of the ink is increased, there is a small effect on the calculation accuracy. Thus, it is possible to make the region of the ejection surface greater than that in a case where the printing mode using the steep gradation mask is set, the region being referred to as a unit of calculation in a case of calculating the amount of the ink used for printing. Once the processing of the present step ends, the present flow ends.

In S1404, the CPU 301 makes the region of the ejection surface provided with the multiple ejection ports 235 smaller than that in a case where the printing mode using the gradual gradation mask is set, the region being referred to as a unit of calculation in a case of calculating the amount of the ink used for printing. Once the processing of the present step ends, the present flow ends.

«Conclusion»

According to the configuration, in a case where "gradual gradation mask" is used, the region of the ejection surface is greater than that in a case of using "steep gradation mask", the region being referred to as a unit of calculation in a case of calculating the amount of the ink. On the other hand, in a case where "steep gradation mask" is used, the region of the ejection surface is smaller than that in a case of using "gradual gradation mask", the region being referred to as a unit of calculation in a case of calculating the amount of the ink. Therefore, according to the printing apparatus 100 of the present embodiment, it is possible to flexibly change the method of calculating the consumption amount of the ink in accordance with a degree of the gradation.

Third Embodiment

In the embodiment 1, the method of calculating the use amount of the ink is changed in accordance with the shape of the used mask. In the present embodiment, the method of calculating the use amount of the ink is changed in accordance with the color of the ink. In the following descriptions, a configuration that is similar to or corresponds to the embodiment 1 is provided with the same reference numeral while omitting the description, and the different points are mainly described.

The printing apparatus 100 according to the present embodiment includes the cartridge 200 preserving each of the inks of cyan (C), magenta (M), yellow (Y), black (Bk), light cyan (LC), light magenta (LM), and prism (Pri). Note that, it is possible to improve the glossiness by coating the formed image by using the prism (Pri) ink. Additionally, the ejection port arrays 220 corresponding to each ink color is formed in the printing head 140 according to the present embodiment.

The printing head 140 according to the present embodiment includes the ejection port arrays 220 in which the ejection ports 235 that eject a liquid (for example, an ink) of a predetermined color (for example, cyan (C)) are arrayed. Additionally, the printing head 140 according to the present embodiment includes the ejection port arrays 220 in which the ejection ports 235 that eject an ink of a color of lower density (for example, light cyan (LC)) than a predetermined color (for example, cyan (C)). Hereinafter, a liquid of the predetermined color is described as an ink of dark color or the like, as needed. Additionally, an ink of the color of lower density than the predetermined color is described as an ink of light color or the like. Moreover, in the present embodiment, the ink of light color (for example, light cyan (LC)) is ejected after a time point at which the ink of dark color is ejected.

In the carriage 130 according to the present embodiment, the cartridges 200 of the above-described seven colors are mounted. Additionally, the carriage 130 according to the present embodiment moves the cartridges 200 in the scanning direction crossing the ejection port array 220. The printing head 140 according to the present embodiment prints an image on the printing medium P by controlling the ejection ports 235 ejecting the ink of dark color and the ejection ports 235 ejecting the ink of light color, the carriage 130, and the conveyer motor 312.

Additionally, the color processing unit 321 according to the present embodiment performs color separation on the RGB image data obtained by the color gamut conversion by using the color conversion table (not illustrated). That is, the color processing unit 321 converts the image data of RGB into image data (ink application amount data) for the ink colors (that is, C, M, Y, LC, LM, Bk, and Pri) used in the printing apparatus 100. Moreover, the halftone processing unit 322 according to the present embodiment performs pseudo-halftone process (halftoning processing) such as error diffusion on each of the inputted ink colors (that is, C, M, Y, LC, LM, Bk, Pri) of a multilevel signal of 12 bits and 4096 values. After performing the halftoning processing, the halftone processing unit 322 according to the present embodiment converts the multilevel signal of 12 bits and 4096 values into binary data with less values than 4096 values.

Figure 16:
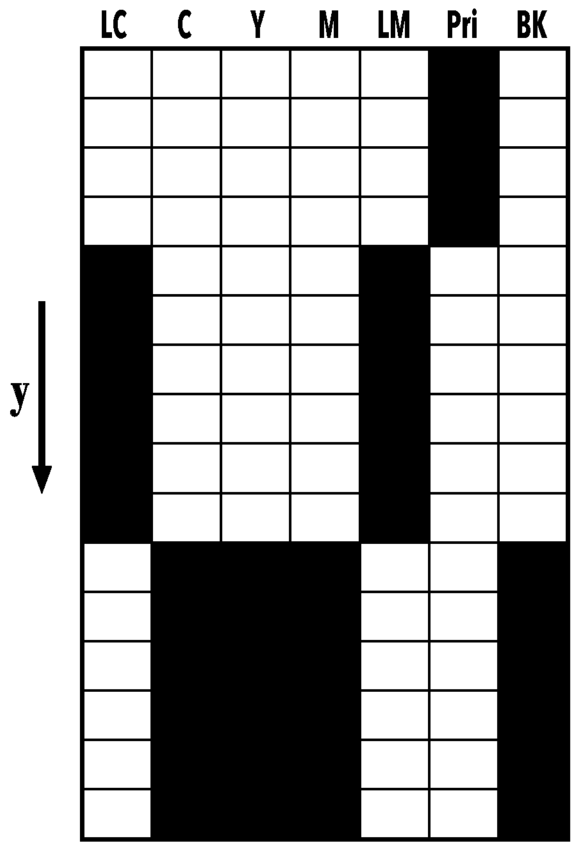
FIG. 16 is a diagram illustrating an example of a mask.

FIG. 16 is a diagram illustrating an example of the mask pattern used in the present embodiment. As illustrated in FIG. 16, some of the ejection ports 235 may not be used for each color. For example, in a case where an object is color gamut expansion, some of the ejection ports 235 are not used. While an image is formed by repeating the main scanning and the sub scanning, an ink of different color can be ejected on the same position to be overlapped later by ejecting the inks separated in multiple times of passes by properly using the ejection ports 235 depending on the colors as illustrated in FIG. 16. As a result, it is possible to expand the color gamut.

In a case where the mask illustrated in FIG. 16 is used, the region of the ejection surface provided with the multiple ejection ports 235, which is referred to as a unit of calculation in a case of calculating the amount of the ink used for printing, is limited to only a region including the ejection ports 235 to be used. That is, the region of the ejection surface, which is referred to as a unit of calculation in a case of calculating the use amount of the ink, is limited to a black-colored area as illustrated in FIG. 16 for each color. With this, it is possible to reduce a processing load while maintaining the accuracy in the calculation of the use amount of the ink.

Figure 17:
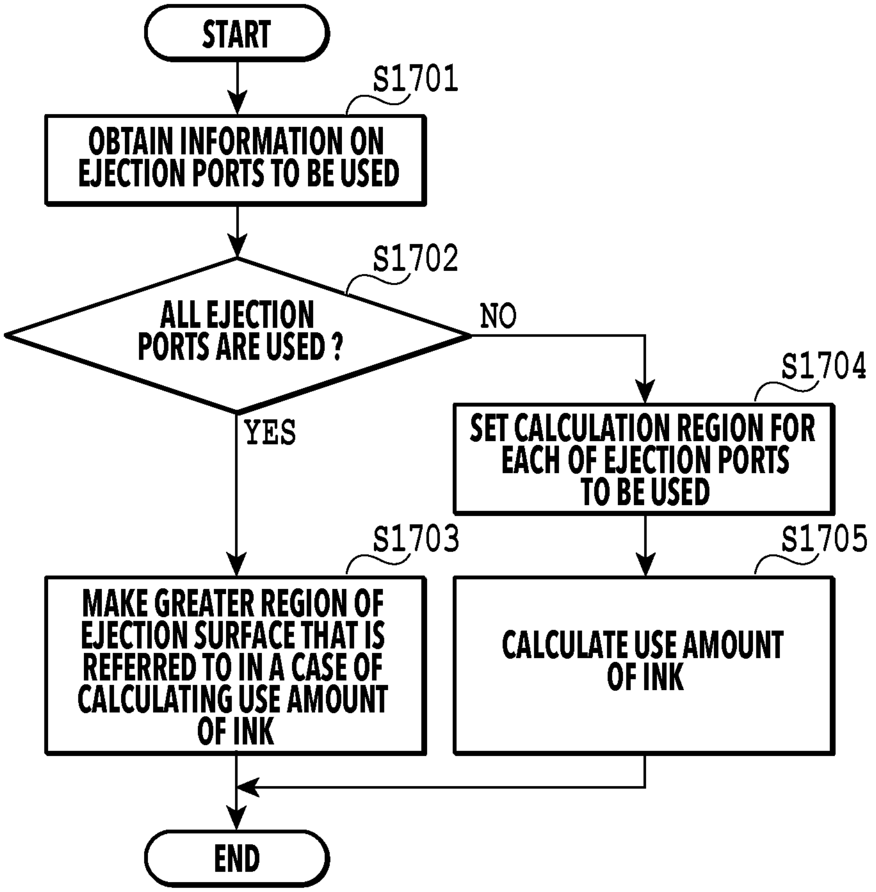
FIG. 17 is a flowchart illustrating a flow to determine the method of calculating the consumption amount of the ink.

FIG. 17 is a flowchart illustrating processing to determine the method of calculating the use amount of the ink according to the present embodiment. In S1701, the CPU 301 obtains the information on the setting of the printing mode in accordance with the type of the radio button selected by the user. Specifically, the CPU 301 obtains the information on the ejection ports 235 to be used in accordance with the type of the radio button selected by the user. In S1702, the CPU 301 determines processing to be performed subsequently based on the information obtained in S1701. Specifically, if the printing mode using the flat mask (for example, "fast mode") is set, the processing proceeds to S1703. On the other hand, if the printing mode using the gradation mask (for example, "high quality mode") is set, the processing proceeds to S1704.

In S1703, the CPU 301 makes the region of the ejection surface provided with the multiple ejection ports 235 greater than that in a case where the printing mode using the gradation mask is set, the region being referred to as a unit of calculation in a case of calculating the amount of the ink used for printing. Then, the CPU 301 calculates the amount of the ink used for printing. In the present step, the flat mask is used. Thus, as illustrated in FIG. 12, for the color of the ink used for printing, all the ejection ports 235 are used. Accordingly, the region of the ejection surface is greater than that in a case where the printing mode using the gradation mask is set, the region being referred to as a unit of calculation. Once the processing of the present step ends, the present flow ends.

In S1704, for each ejection port 235 of the ink color to be used, the CPU 301 sets the region of the ejection surface provided with the multiple ejection ports 235, which is referred to as a unit of calculation in a case of calculating the amount of the ink used for printing. In S1705, the CPU 301 calculates the use amount of the ink in the region set in S1704. Once the processing of the present step ends, the present flow ends.

In the present embodiment, the printing dot number in the ejection ports 235 that eject the ink of the predetermined color and the printing dot number in the ejection ports 235 that eject the ink of the color of a lower density than that of the predetermined color are counted. Additionally, based on the ejection amount conversion factor corresponding to the temperature of the printing head 140, the use amount of the ink is calculated by using different calculation methods between a case where the ink of the predetermined color is ejected and a case where the ink of the color of a lower density than that of the predetermined color is ejected. Specifically, processing to calculate a use amount of the ink of the predetermined color and a use amount of the ink of the color of a lower density than that of the predetermined color in a case of performing printing based on the printing data is executed. The above is the general process of control performed by the CPU 301.

Figure 18A:
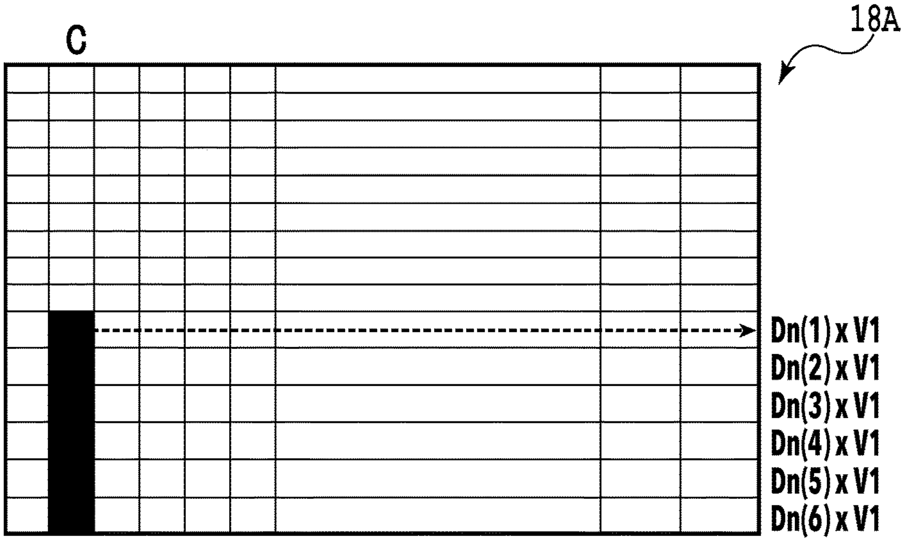
FIGS. 18A to 18C are diagrams describing the method of calculating a use amount of the ink.
Figure 18B:
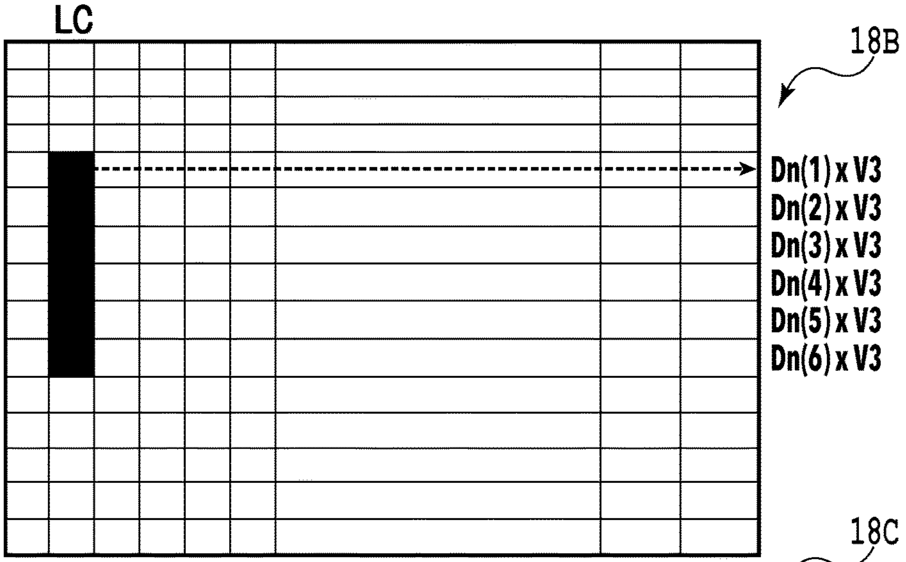
Figure 18C:
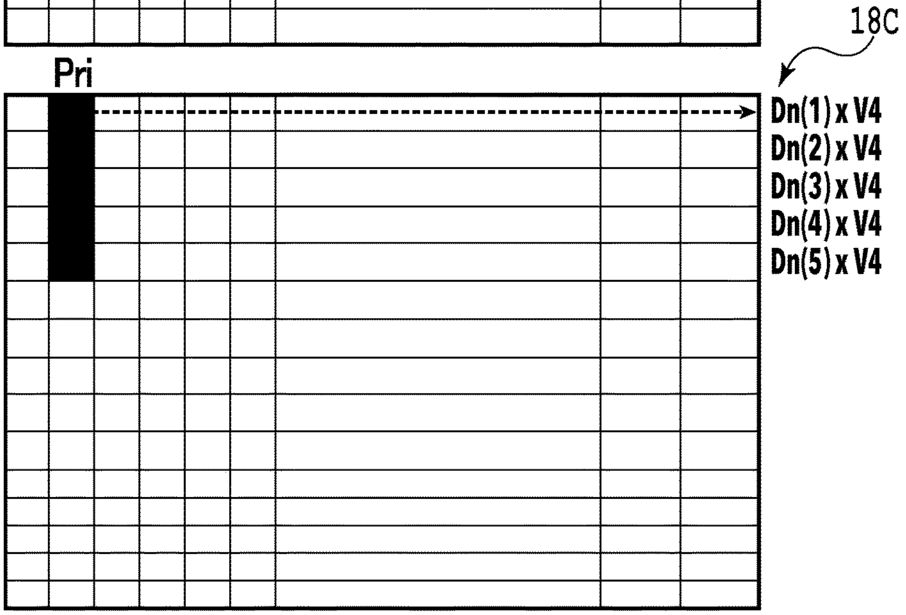

FIGS. 18A to 18C are diagrams describing a method of calculating the use amount of the ink. In FIGS. 18A to 18C, a black-colored area indicates a position in which printing is permitted. On the other hand, a white-colored area indicates a position in which printing is not permitted. For example, in the above-described S1704, the black-colored area illustrated in FIG. 18 is set as a calculation region to be referred to in a case of calculating the use amount of the ink. Additionally, the calculation method illustrated in FIGS. 18A to 18C is used in the above-described S1705.

FIG. 18A is a diagram illustrating an example of calculating the use amount of the ink from image data of a first pass and of one time of scanning in a case of ejecting the ink of dark color. An example of the dark color may include cyan (C), magenta (M), yellow (Y), and black (Bk). In FIG. 18A, a case where an ink of cyan (C) is used as the ink of dark color is described as an example. Additionally, on the left side in FIG. 18A, the mask pattern used in a case of ejecting the ink of cyan (C) is illustrated. Note that, the mask pattern used in FIG. 18A is referred to as a first mask 18A.

Moreover, the expressions illustrated on the right side in FIG. 18A indicate expressions used in a case of calculating the use amount of the ink of dark color. In a case where the first mask 18A is used, in order to eject the ink, only the ejection ports 235 on the downstream side in the sub scanning direction (the lower side in FIG. 18A) out of all the ejection ports 235 are used. Thus, the region referred to for calculating the use amount of the ink is limited to only the downstream side in the sub scanning direction. In the illustrated example, in order to eject the ink, six ejection ports 235 from the downstream side are used. Accordingly, the region of the ejection surface provided with the multiple ejection ports 235, which is referred to as a unit of calculation in a case of calculating the amount of the ink used for printing, is limited to a region including the six ejection ports 235 from the downstream side. Additionally, in this case, in order to calculate the use amount of the ink, the printing dot number Dn of each ejection port 235 that ejects the ink of dark color is multiplied by the first ejection amount conversion factor V1 of the smallest value out of the example illustrated in FIG. 10. In a case where printing with multiple passes is performed, the ink of dark color is ejected in the first pass. Thus, it can be considered that there is a low possibility that the printing head 140 is scanned at a time point before the time point of performing the ejection in a case of ejecting the ink of dark color. Accordingly, there is a high possibility that no afterheat of the scanning remains in the printing head 140 in a case of ejecting the ink of dark color. Thus, the printing dot number Dn of each ejection port 235 used to eject the ink of dark color is multiplied by the first ejection amount conversion factor V1.

FIG. 18B is a diagram illustrating an example of calculating the use amount of the ink from image data of a second pass and of one time of scanning in a case of ejecting the ink of light color. An example of the light color may include light cyan (LC) and light magenta (LM). In FIG. 18B, a case where an ink of light cyan (LC) is used as the ink of light color is described as an example. Additionally, on the left side in FIG. 18B, the mask pattern used in a case of ejecting the ink of light cyan (LC) is illustrated. Note that, the mask pattern used in FIG. 18B is referred to as a second mask 18B. Moreover, the expressions illustrated on the right side in FIG. 18B indicate expressions used in a case of calculating the use amount of the ink of light color. In a case where the second mask 18B is used, in order to eject the ink, only the ejection ports 235 in the center portion in the sub scanning direction (center portion in FIG. 18B) out of all the ejection ports 235 are used. Thus, the region referred to for calculating the use amount of the ink is limited to only the center portion in the sub scanning direction. In the illustrated example, in order to eject the ink, fifth to tenth ejection ports 235 from the upstream side (the upper side in FIG. 18B) are used. Accordingly, the region of the ejection surface provided with the multiple ejection ports 235, which is referred to as a unit of calculation in a case of calculating the amount of the ink used for printing, is limited to a region including the fifth to tenth ejection ports 235 from the upstream side. Additionally, in this case, in order to calculate the use amount of the ink, the printing dot number Dn of each ejection port 235 that ejects the ink of light color is multiplied by the third ejection amount conversion factor V3 of the second greatest value out of the example illustrated in FIG. 10. In a case where printing with multiple passes is performed, the ink of light color is ejected in the second pass. Thus, it can be considered that there is a high possibility that the printing head 140 is scanned for ejecting the ink of dark color at a time point before the time point of performing the ejection in a case of ejecting the ink of light color. Accordingly, there is a high possibility that afterheat of the scanning for ejecting the ink of dark color remains in the printing head 140 in a case of ejecting the ink of light color. Thus, the printing dot number Dn of each ejection port 235 used to eject the ink of light color is multiplied by the third ejection amount conversion factor V3.

FIG. 18C is a diagram illustrating an example of calculating the use amount of the ink from image data of a third pass and of one time of scanning in a case of ejecting an ink for improving the glossiness. An example of the ink for improving the glossiness may include an ink of prism (Pri) and an ink of clear (CL). In FIG. 18C, a case where the ink of prism (Pri) is used as the ink for improving the glossiness is described as an example. Additionally, on the left side in FIG. 18C, the mask pattern used in a case of ejecting the ink of prism (Pri) is illustrated. Note that, the mask pattern used in FIG. 18C is referred to as a third mask 18C. Moreover, the expressions illustrated on the right side in FIG. 18C indicate expressions used in a case of calculating the use amount of the ink used for improving the glossiness. In a case where the third mask 18C is used, in order to eject the ink, only the ejection ports 235 on the upstream side in the sub scanning direction (the upper side in FIG. 18C) out of all the ejection ports 235 are used. Thus, the region referred to for calculating the use amount of the ink is limited to only the upstream side in the sub scanning direction. In the illustrated example, in order to eject the ink, five ejection ports 235 from the upstream side (the upper side in FIG. 18C) are used. Accordingly, the region of the ejection surface provided with the multiple ejection ports 235, which is referred to as a unit of calculation in a case of calculating the amount of the ink used for printing, is limited to a region including the five ejection ports 235 from the upstream side. Additionally, in this case, in order to calculate the use amount of the ink, the printing dot number Dn of each ejection port 235 that ejects the ink for improving the glossiness is multiplied by the fourth ejection amount conversion factor V4 of the greatest value out of the example illustrated in FIG. 10. In a case where printing with multiple passes is performed, the ink for improving the glossiness is ejected at last. Thus, it can be considered that there is a high possibility that the printing head 140 is scanned for ejecting the ink of dark color, the ink of light color, or both at a time point before the time point of performing the ejection in a case of ejecting the ink for improving the glossiness. Accordingly, there is a high possibility that afterheat of the scanning for ejecting the ink of dark color, the ink of light color, or both remains in the printing head 140 in a case of ejecting the ink for improving the glossiness. Thus, the printing dot number Dn of each ejection port 235 used to eject the ink for improving the glossiness is multiplied by the fourth ejection amount conversion factor V4.

That is, in the present embodiment, the different ejection amount conversion factors (V) are multiplied between a case where the ink of dark color is ejected, a case where the ink of light color is ejected, and a case where the ink for improving the glossiness is ejected.

Figure 19:
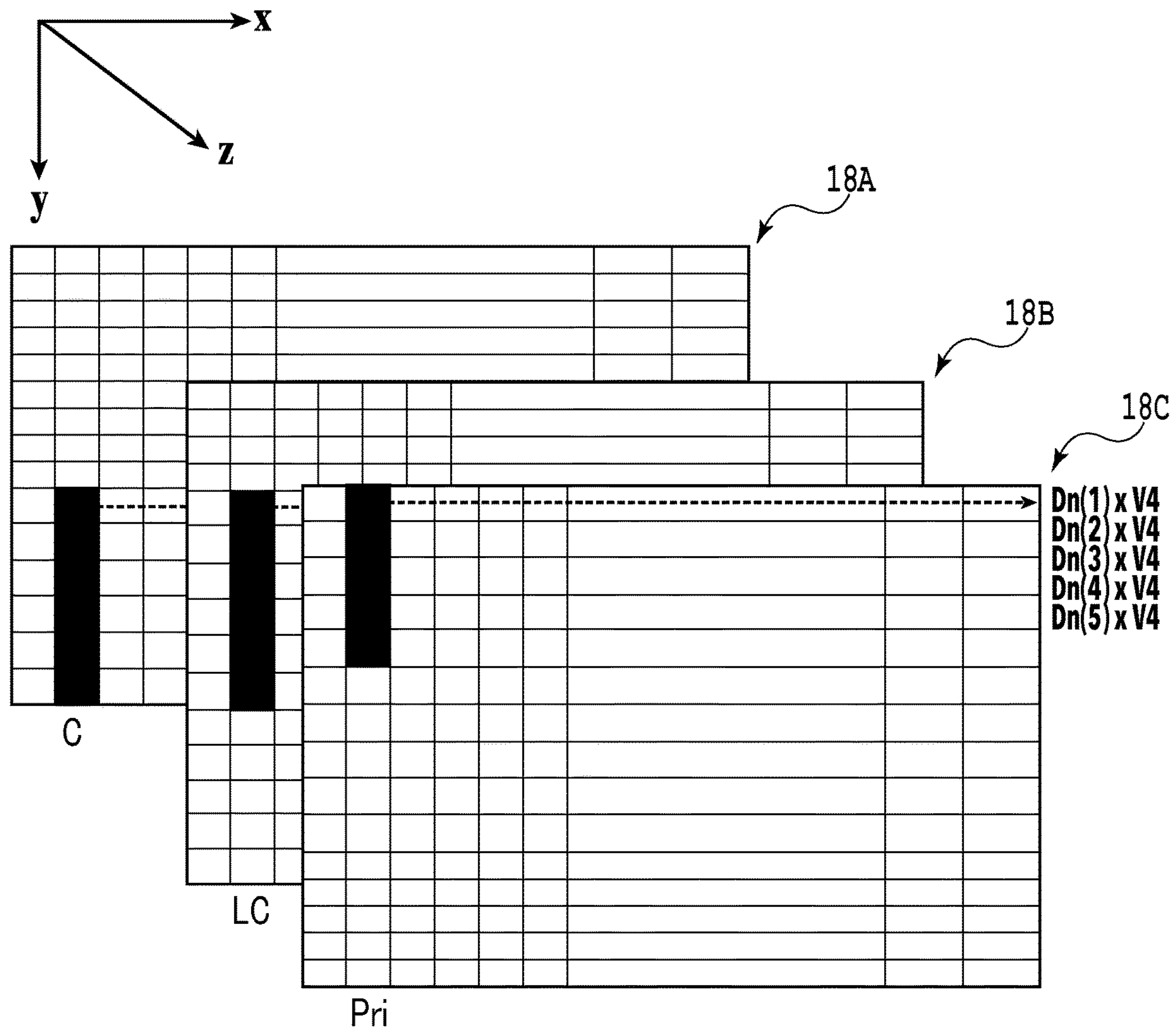
FIG. 19 is a diagram describing a method of calculating a total use amount of the ink.

FIG. 19 is a diagram describing a method of calculating the total use amount of the ink according to the present embodiment. For explanatory convenience, the first mask 18A, the second mask 18B, and the third mask 18C are illustrated to be displaced from each other; however, in reality, light cyan (LC) is applied over the same region in which the above-described ink of cyan (C) is ejected. Additionally, in the region in which the above-described ink of cyan (C) and light cyan (LC) are ejected, the ink of prism (Pri) is applied over the region corresponding to the five ejection ports 235 from the upstream side.

Accordingly, in the present embodiment, first, the printing dot number Dn of each ejection port 235 that ejects the ink of dark color is multiplied by the first ejection amount conversion factor V1 of the smallest value. With all the values obtained by the multiplication being accumulated, the total use amount of the ink of dark color is obtained.

Subsequently, the printing dot number Dn of each ejection port 235 that ejects the ink of light color is multiplied by the third ejection amount conversion factor V3. With all the values obtained by the multiplication being accumulated, the total use amount of the ink of light color is obtained.

Finally, the printing dot number Dn of each ejection port 235 that ejects the ink for glossiness is multiplied by the fourth ejection amount conversion factor V4. With all the values obtained by the multiplication being accumulated, the total use amount of the ink for glossiness is obtained.

Then, it is possible to obtain the total use amount of the ink in the entire printing apparatus 100 by combining the total use amount of the ink of dark color, the total use amount of the ink of light color, and the total use amount of the ink for glossiness with each other. As described above, in a case of using the mask that uses properly the ejection ports 235 used for each color, the region referred to as a unit of calculation for calculating the use amount of the ink of each color is limited to only the region provided with the ejection ports 235 for each ink color. With this, it is possible to reduce a processing load while maintaining the accuracy of calculating the use amount of the ink.

Other Embodiment

In S402 of the embodiment 1, the number of passes during the printing operation is determined in accordance with the printing quality selected by the user (for example, "fast", "standard", or "high quality"). As another example, the number of passes during the printing operation may be determined in accordance with the type of the printing medium P selected by the user. For example, printing may be performed with one pass in a case where the user selects "plain paper". Additionally, printing may be performed with multiple passes in a case where the user selects "glossy paper" or "coated paper". Specifically, printing may be performed with two passes in a case where the user selects "glossy paper". Additionally, printing may be performed with four passes in a case where the user selects "coated paper".

As a matter of course, whether printing is performed with one pass or multiple passes may be determined taking into consideration both the printing quality and the printing medium P selected by the user. For example, "glossy paper" is often used in a case of putting priority on the image quality rather than the printing speed. Thus, in a case where "glossy paper" is selected, usually, printing with multiple passes is more proper than printing with one pass. Accordingly, for example, even if "fast" is selected as the printing quality, there may be a case that it is better to perform printing with multiple passes instead of printing with one pass. That is, the number of passes can be changed in accordance with the application of the printing medium P (for example, printing paper). For example, printing may be performed with two passes in a case where the user selects "fast" and "glossy paper". As another example, printing may be performed with four passes in a case where the user selects "standard" and "glossy paper". Additionally, as another example, printing may be performed with eight passes in a case where the user selects "high quality" and "glossy paper".

In the embodiment 1, the flat mask is used in a case of "two-pass printing mode". As another example, in a case of "two-pass printing mode", a gradation mask of a comparatively small difference in the ejection frequencies between the ejection ports 235 in the center portion and the ejection ports 235 in the two end portions may be used.

In S1102 of the embodiment 1, an example where the processing proceeds to S1103 if the printing mode using the flat mask is set is described. As another example, there may be an example where the processing proceeds to S1103 if the printing mode in which printing is performed with one pass is set.

In the embodiment 2, "gradual gradation mask" is defined as "gradation mask in which the maximum value of the slope of the graph is smaller than ¼". As another example, "gradual gradation mask" may be defined by using a standard deviation. That is, how to define is not limited to the slope of the graph.

In the embodiment 3 (FIG. 19), the use amount of the ink is calculated so as to further reduce the number of the ejection ports 235 used to calculate the total use amount of the ink. As another example, an average of the adjacent ejection ports 235 may be taken depending on the used mask (for example, the flat mask) to further improve the processing speed.

Additionally, control to limit the calculation region to only the used ejection ports 235 may be executed similarly in a case where only some of the ejection ports 235 are used during printing for a tip end and a rear end of the printing medium P such as marginless printing.

Moreover, in the above-described embodiments, a so-called serial type liquid ejection head that ejects an ink while moving in the main scanning direction is described as example of the printing head 140; however, it is not limited thereto. A so-called full-line type liquid ejection head in which the ejection ports 235 are formed over the entirety in the width direction of the printing medium P and it is possible to perform ejection in the entire area in the width direction of the printing medium P without moving in the main scanning direction may be applied. In this case, a mode in which the printing accuracy is changed by changing the conveyance speed to convey the printing medium P may be applied. That is, even with the full-line type apparatus, the speed and the quality during printing can be changed in accordance with the printing mode.

Furthermore, in the above-described embodiments, an example where the use amount of the ink used for printing is calculated by multiplying the printing dot number Dn by the ejection amount conversion factor corresponding to the temperature of the printing head 140; however, it is not limited thereto. Another calculation method may be used as the calculation method as long as it is possible to obtain the use amount of the ink used for printing.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, it is possible to provide a technique of calculating an ejection amount of a liquid in accordance with a temperature of a printing head.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-212544, filed Dec. 27, 2021 which is hereby incorporated by reference herein in its entirety.

What is claimed is:

1. A printing apparatus comprising:

a printing head including an ejection port array in which a plurality of ejection ports to eject an ink are arrayed;

a conveyer unit configured to convey a printing medium in a conveyance direction;

a controller unit configured to count a printing dot number based on printing data, perform a first calculation for calculating an amount of the ink used in a case of performing printing based on the printing data in a case where a first printing mode is set based on the printing dot number, and perform a second calculation different from the first calculation for calculating an amount of the ink used in a case of performing printing based on the printing data in case where a second printing mode is set, wherein the controller unit is configured to (1) in a case where the first printing mode is set, refer to a first region greater than a second region of an ejection surface provided with the plurality of ejection ports as a unit of the first calculation, and (2) in a case where the second printing mode is set, refer to the second region smaller than the first region as a unit of the second calculation.

2. The printing apparatus according to claim 1, wherein a difference between the first printing mode and the second printing mode is a conveyance speed or a conveyance amount of the conveyer unit.

3. The printing apparatus according to claim 1, wherein a conveyance speed of the conveyer unit in a printing operation in the first printing mode is faster than a conveyance speed of the conveyer unit in a printing operation in the second printing mode.

4. The printing apparatus according to claim 1, wherein a conveyance amount of the conveyer unit in a printing operation in the first printing mode is greater than a conveyance amount of the conveyer unit in a printing operation in the second printing mode.

5. The printing apparatus according to claim 1, further comprising:

a movement unit configured to move the printing head in a scanning direction crossing a direction in which the plurality of ejection ports are arrayed, wherein a number of passes in a case of printing an image in the second printing mode is greater than a number of passes in a case of printing an image in the first printing mode, and wherein the printing head prints an image with a plurality of times of passes on a predetermined region including a plurality of unit regions on the printing medium.

6. The printing apparatus according to claim 1, wherein each of the first calculation and the second calculation is a method of multiplying the dot number to be printed by an ejection amount conversion factor corresponding to the temperature of the printing head.

7. The printing apparatus according to claim 6, wherein the ejection amount conversion factor used in a case where the temperature of the printing head is a first temperature.

8. The printing apparatus according to claim 1, further comprising:

a temperature sensor configured to detect the temperature of the printing head, wherein the controller unit performs the first calculation and the second calculation by using the temperature of the printing head detected by the temperature sensor.

9. The printing apparatus according to claim 1, wherein the controller unit is configured to, in a case where the first printing mode is set, calculate an average value of the dot numbers to be printed between the plurality of adjacent ejection ports as the first calculation and calculate an amount of an ink droplet used for the printing assuming that the average value is a value of the dot number to be printed.

10. The printing apparatus according to claim 1, wherein the first printing mode is a printing mode using a flat mask configured such that the ejection frequencies of ink droplets ejected by the plurality of ejection ports are equal to each other.

11. The printing apparatus according to claim 1, wherein the controller unit is configured to, in a case where the second printing mode is set, calculate the dot number to be printed corresponding to each of the plurality of ejection ports, multiplies the dot number by the ejection amount conversion factor in accordance with each of the plurality of ejection ports, and calculate the amount of the ink droplet used for the printing by accumulating ejection amounts of the plurality of ejection ports.

12. The printing apparatus according to claim 1, wherein the second printing mode is a printing mode using a mask configured such that ejection frequencies of ejection ports provided in a center portion in an ejection port group including the plurality of ejection ports are high and ejection frequencies of ejection ports provided on sides of end portions in the ejection port group are low.

13. The printing apparatus according to claim 12, wherein the controller unit is configured to, in a case where a shape of a mask such that the ejection frequencies are low is illustrated by using a graph, (1) calculate an average value of the dot numbers to be printed between the plurality of adjacent ejection ports in a case where a slope of the graph does not exceed a predetermined value as the second calculation, and (2) calculate the amount of the ink droplet used for the printing assuming that the average value is a value of the dot number to be printed.

14. The printing apparatus according to claim 1, wherein the controller unit is configured to, in a case where a shape of a mask configured such that ejection frequencies vary across the plurality of ejection ports is illustrated by using a graph, (1) calculate an average value of the dot numbers to be printed between the plurality of adjacent ejection ports in a case where a slope of the graph does not exceed a predetermined value as the second calculation, and (2) calculate the amount of the ink droplet used for the printing assuming that the average value is a value of the dot number to be printed.

15. A printing apparatus comprising:

a printing head including a first ejection port array in which first ejection ports to eject an ink droplet of a predetermined color are arrayed and a second ejection port array in which second ejection ports to eject an ink droplet of a color of lower density than the predetermined color are arrayed;

a conveyer unit configured to convey a printing medium in a conveyance direction; and a controller unit configured to store printing data of at least one scanning in a printing buffer, count a dot number in the first ejection ports and a dot number in the second ejection ports based on the printing data, and calculate a use amount of the ink droplet of the predetermined color and a use amount of the ink droplet of the color of lower density than the predetermined color in a case of performing printing based on the printing data by using different methods between a case where the ink droplet of the predetermined color is ejected and a case where the ink droplet of the color of lower density than the predetermined color is ejected based on the dot number in the first ejection ports and the dot number in the second ejection ports and an ejection amount conversion factor corresponding to a temperature of the printing head.

16. The printing apparatus according to claim 15, further comprising:

a movement unit configured to move the printing head in a scanning direction crossing a direction in which plurality of ejection ports are arrayed, wherein the printing head prints an image with a plurality times of passes on a predetermined region including a plurality of unit regions on a printing medium.

17. The printing apparatus according to claim 15, wherein the ink droplet of the color of lower density than the predetermined color is ejected in a region in which the ink droplet of the predetermined color is ejected at a time point after a time point at which the ink droplet of the predetermined color is ejected.

18. The printing apparatus according to claim 15, further comprising:

a temperature sensor configured to detect the temperature of the printing head, wherein the controller unit is configured to perform the calculation by using the temperature of the printing head detected by the temperature sensor.

19. The printing apparatus according to claim 15, wherein the calculation method is a method of multiplying the dot number to be printed by the ejection amount conversion factor corresponding to the temperature of the printing head.

20. The printing apparatus according to claim 15, wherein the ejection amount conversion factor is set to be a greater value in accordance with the temperature of the printing head.

21. The printing apparatus according to claim 15, wherein the controller unit is configured to, in a case where the ink droplet of the color of lower density than the predetermined color is ejected, calculate an amount of the ink droplet of the color of lower density than the predetermined color used for the printing by multiplying the ejection amount conversion factor of a greater value than that of a case where the ink droplet of the predetermined color is ejected.

22. The printing apparatus according to claim 15, wherein the controller unit is configured to, in a case where the ink droplet of the predetermined color is ejected, calculate an amount of the ink of the predetermined color used for the printing by multiplying the ejection amount conversion factor of a smaller value than that of a case where the ink droplet of the color of lower density than the predetermined color is ejected.

23. The printing apparatus according to claim 15, wherein the printing head has a third ejection port array in which third ejection ports to eject an ink droplet for improving glossiness after a time point at which the second ejection port ejects the ink droplet of the color of lower density than the predetermined color are arrayed, and wherein the controller unit is configured to, in a case where the ink droplet for improving glossiness is ejected, calculate an amount of the ink droplet for improving glossiness used for the printing by multiplying the ejection amount conversion factor of a greater value than that of a case where the ink droplet of the color of lower density than the predetermined color is ejected.

24. A method of controlling a printing apparatus, the printing apparatus including (1) a printing head including an ejection port array in which a plurality of ejection ports to eject an ink droplet are arrayed, (2) a conveyer unit configured to convey a printing medium in a direction crossing a scanning direction, and (3) a controller unit, the method comprising the steps of:

counting a dot number to be printed from printing data used for printing; and calculating an amount of the ink droplet used in a case of performing printing based on the printing data by using different methods between a case where a first printing mode is set and a case where a second printing mode is set based on the dot number to be printed and an ejection amount conversion factor corresponding to a temperature of the printing head by using the controller unit, wherein in a case where the first printing mode is set, the calculating refers in a first calculation to a first region greater than a second region of an ejection surface provided with the plurality of ejection ports, and wherein in a case where the second printing mode is set, the calculating refers in a second calculation to the second region smaller than the first region.

25. A method of controlling a printing apparatus, the printing apparatus including (1) a printing head including a first ejection port array in which first ejection ports to eject an ink droplet of a predetermined color are arrayed and a second ejection port array in which second ejection ports to eject an ink droplet of a color of lower density than the predetermined color; (2) a conveyer unit configured to convey a printing medium in a conveyance direction, and (3) a controller unit, the method comprising the steps of:

storing printing data of at least one scanning in a printing buffer;

counting a dot number to be printed in the first ejection ports and a dot number to be printed in the second ejection ports based on the printing data by using the controller unit; and calculating a use amount of the ink droplet of the predetermined color and a use amount of the ink droplet of the color of lower density than the predetermined color in a case of performing printing based on the printing data by using different methods between a case where the ink droplet of the predetermined color is ejected and a case where the ink droplet of the color of lower density than the predetermined color is ejected based on the dot number to be printed in the first ejection ports and the dot number to be printed in the second ejection ports and an ejection amount conversion factor corresponding to a temperature of the printing head by using the controller unit.

* * * * *